(12) United States Patent
Hamaguchi et al.

(10) Patent No.: US 11,126,795 B2
(45) Date of Patent: Sep. 21, 2021

(54) SYSTEMS AND METHODS FOR ANALYZING HUMAN THOUGHT

(71) Applicant: monogoto, Inc., Los Angeles, CA (US)

(72) Inventors: Hideshi Hamaguchi, Portland, OR (US); Motoaki Hirayama, Tokyo (JP)

(73) Assignee: monogoto, Inc., Los Angeles, CA (US)

( * ) Notice: Subject to any disclaimer, the term of this patent is extended or adjusted under 35 U.S.C. 154(b) by 233 days.

(21) Appl. No.: 16/175,240

(22) Filed: Oct. 30, 2018

(65) Prior Publication Data

US 2019/0129943 A1   May 2, 2019

Related U.S. Application Data

(60) Provisional application No. 62/580,118, filed on Nov. 1, 2017.

(51) Int. Cl.

| | |
|---|---|
| *G06F 7/02* | (2006.01) |
| *G06F 16/00* | (2019.01) |
| *G06F 40/30* | (2020.01) |
| *G06F 16/36* | (2019.01) |
| *G06F 40/247* | (2020.01) |
| *G06F 40/279* | (2020.01) |
| *G06N 5/02* | (2006.01) |

(52) U.S. Cl.
CPC .............. *G06F 40/30* (2020.01); *G06F 16/36* (2019.01); *G06F 40/247* (2020.01); *G06F 40/279* (2020.01); *G06N 5/02* (2013.01)

(58) Field of Classification Search
CPC ........ G06F 40/30; G06F 16/36; G06F 40/279; G06F 40/247; G06N 5/02
See application file for complete search history.

(56) References Cited

U.S. PATENT DOCUMENTS

| | | |
|---|---|---|
| 6,037,944 A | 3/2000 | Hugh |
| 6,138,116 A | 10/2000 | Kitagawa et al. |
| 6,389,418 B1 | 5/2002 | Boyack et al. |
| 6,629,097 B1 | 9/2003 | Keith |
| 6,918,096 B2 | 7/2005 | Hugh |

(Continued)

FOREIGN PATENT DOCUMENTS

| | | |
|---|---|---|
| JP | 2007317070 | 12/2007 |
| WO | 2004111759 A2 | 12/2004 |

OTHER PUBLICATIONS

Fugmann, Robert et al., "TOSAR—A Topological Method for the Representation of Synthetic and Analytical Relations of Concepts," Angewandte Chemie International Edition Aug. 1970. (Year: 1970).*

(Continued)

*Primary Examiner* — Bruce M Moser
(74) *Attorney, Agent, or Firm* — Austin Rapp

(57) ABSTRACT

A method for analyzing a thought system is described. One or more keywords and a degree of relation between each of the one or more keywords are obtained. An N×N matrix based on the one or more keywords and the degree of relation between each of the one or more keywords are determined. (N−1) eigenfunctions having N-dimensional components and (N−1) eigenvalues is determined from the N×N matrix using the wave equation for quantum theory. A graphical representation based on the (N−1) eigenfunctions and the (N−1) eigenvalues is generated.

21 Claims, 40 Drawing Sheets

(56) References Cited

U.S. PATENT DOCUMENTS

| | | |
|---|---|---|
| 7,043,535 B2 | 5/2006 | Chi et al. |
| 7,440,931 B1 | 10/2008 | Suzuki |
| 8,171,032 B2 | 5/2012 | Herz |
| 8,873,813 B2 | 10/2014 | Tadayon et al. |
| 2003/0160817 A1* | 8/2003 | Ishida .................. G06F 16/954 715/738 |
| 2004/0117403 A1 | 6/2004 | Horn et al. |
| 2004/0234932 A1* | 11/2004 | Hughes ............. G06Q 30/0271 434/236 |
| 2006/0155751 A1 | 7/2006 | Geshwind et al. |
| 2007/0016592 A1 | 1/2007 | Ferla et al. |
| 2007/0180586 A1 | 8/2007 | Amin |
| 2008/0103721 A1* | 5/2008 | Tsai ...................... G06Q 10/00 702/127 |
| 2010/0235307 A1 | 9/2010 | Sweeney et al. |
| 2011/0015991 A1 | 1/2011 | Fayyad et al. |
| 2012/0047123 A1 | 2/2012 | Coifman et al. |
| 2013/0021346 A1 | 1/2013 | Terman |
| 2014/0303931 A1 | 10/2014 | Suzuki |
| 2015/0026112 A1 | 1/2015 | Alboszta et al. |
| 2015/0154147 A1 | 6/2015 | Alboszta et al. |
| 2016/0140126 A1 | 5/2016 | Aravamudan et al. |
| 2016/0210560 A1 | 7/2016 | Alboszta et al. |

OTHER PUBLICATIONS

International Search Report and Written Opinion issued for PCT Application No. PCT/US2018/058372 dated Feb. 15, 2019.
Douglas, Jr., "The Application of Stability Analysis in the Numerical Solution of Quasi-Linear Parabolic Differential Equations", [retrieved on Feb. 4, 2019], [Retrieved from the Internet: URL: https://www.ams.org/journals/tran/1958-089-02/S0002-9947-1958-0131673-9/S0002-9947-1958-0131673-9.pdf] Aug. 1956.
Heisenberg et al., "Consequences of Dirac's Theory of the Positron", [retrieved on Feb. 4, 2019], [Retrieved from the Internet: URL: https://arxiv.org/pdf/physics/0605038.pdf] May 4, 2006.
Scanamind, www.scanamind.com/index.html, Creative Brains, Inc. Aug. 24, 2018.
How to use Scanamind, www.scanamind.com/howto.html, Creative Brains, Inc. Aug. 24, 2018.
Advantages of Scanamind, www.scanamind.com/power.html, Creative Brains, Inc. Aug. 24, 2018.
What is Collective unconscious?, www.scanamind.com/2levels.html, Creative Brains, Inc. Aug. 24, 2018.
Power of intuition, www.scanamind.com/2seconds.html, Creative Brains, Inc. Aug. 24, 2018.
Invitation to Pay Additional Fees issued for International Application No. PCT/US2018/058372 dated Dec. 11, 2018.

* cited by examiner

SYSTEMS AND METHODS FOR ANALYZING HUMAN THOUGHT

RELATED APPLICATIONS

This application is related to and claims priority from U.S. Provisional Patent Application No. 62/580,118, entitled "SYSTEMS AND METHODS FOR ANALYZING HUMAN THOUGHT," filed on Nov. 1, 2017, which is hereby incorporated by reference herein, in its entirety.

TECHNICAL FIELD

This disclosure relates to systems and methods for analyzing human thought. In particular, it describes systems and methods that utilize the wave equation of quantum theory to analyze relationships between keywords.

BACKGROUND

Computer technologies have advanced at a rapid pace. Computing devices have become smaller and more powerful in order to meet consumer needs. These computing devices have spread into all areas of daily life. Consumers have become dependent upon computing devices and have come to expect reliable service and performance, expanded areas of coverage and increased functionality.

Most people interact with many different computing devices every day. Because so many computer systems are used to interact with people throughout society, it would be beneficial if these computer systems could more efficiently analyze and predict the behavior of the consumers they serve.

As illustrated by this discussion, systems and methods that improve a computing device's ability to analyze human thought may be beneficial.

DETAILED DESCRIPTION

Figure 1:
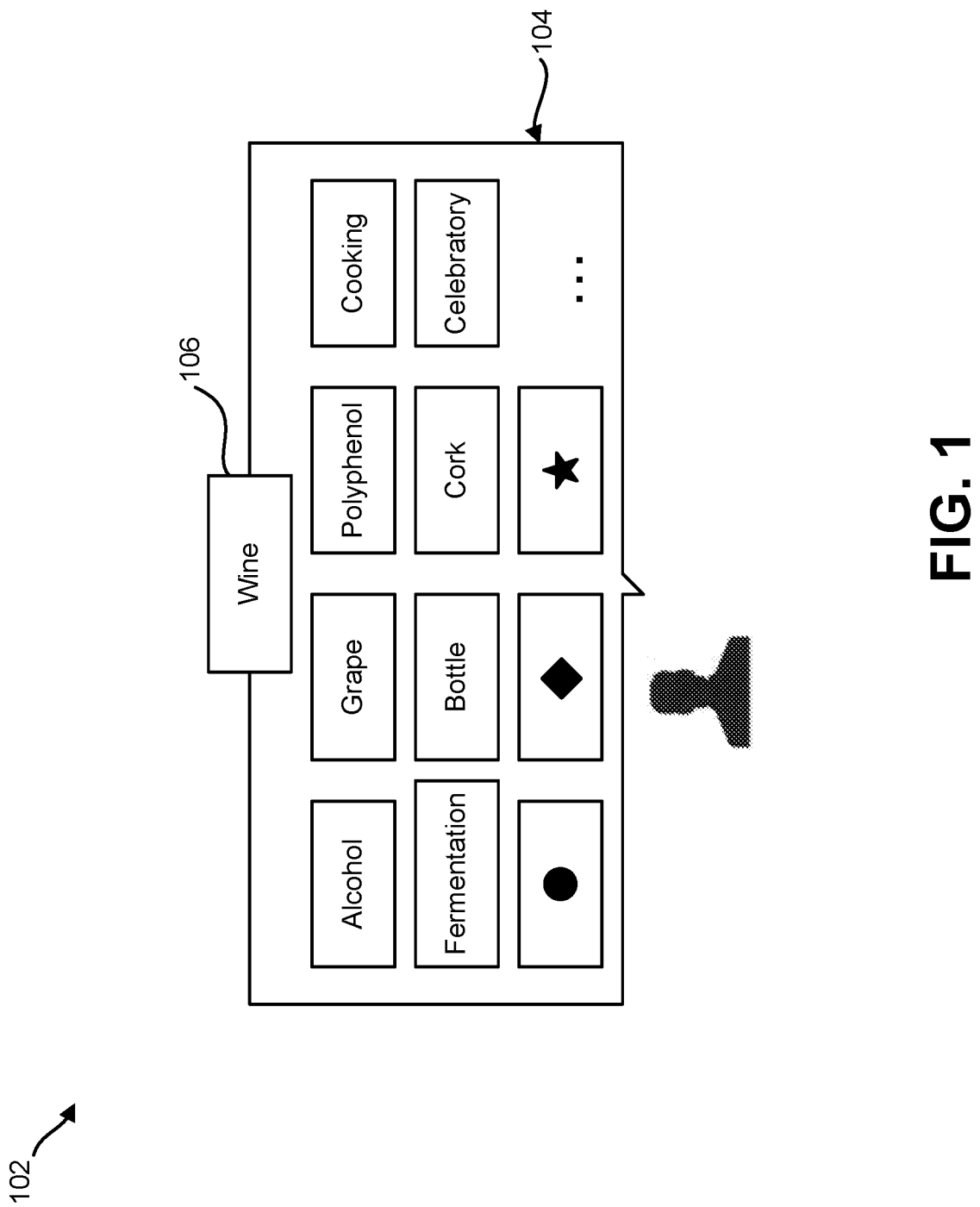
FIG. 1 is a diagram illustrating one example of keywords related to a theme.

A method for analyzing a thought system is described. One or more keywords and a degree of relation between each of the one or more keywords are obtained. An N×N matrix based on the one or more keywords and the degree of relation between each of the one or more keywords are determined. (N−1) eigenfunctions having N-dimensional components and (N−1) eigenvalues is determined from the N×N matrix using the wave equation for quantum theory. A graphical representation based on the (N−1) eigenfunctions and the (N−1) eigenvalues is generated.

The method may also determine an (N−1)×N matrix by dividing the (N−1) eigenfunctions by the (N−1) eigenvalues. The (N−1)×N matrix may indicate coordinates of N points in an (N−1) dimension. The (N−1) eigenvalues may indicate an ease of viewing in each direction of (N−1) dimensions. The method may also define a hierarchical structure that specifies relationships among one or more themes and the one or more keywords.

Generating the graphical representation may include selecting two axes from the (N−1) directions. Furthermore, generating the graphical representation may include generating coordinates for the one or more keywords, wherein generating coordinates in the (N−1) dimension for the i-th keyword comprises multiplying (N−1) eigenfunctions, excluding trivial solutions, by a reciprocal weight of eigenvalues. The (N−1) eigenfunctions may be determined for the harmonic and/or hierarchical directions.

A method for renormalizing keywords in a thought system is also described. One or more keywords and a degree of relation between each of the one or more keywords are obtained. An N×N matrix based on the one or more keywords and the degree of relation between each of the one or more keywords are determined. The N×N matrix is renormalized to determine a degree of relation as a keyword.

The method for renormalizing keywords in a thought system may also include determining a degree of relation between concepts. Furthermore, the method may include defining a hierarchical structure that specifies relationships among one or more themes and the one or more keywords. Renormalizing the N×N matrix may include determining the degree of relation between one or more themes. Renormalizing the N×N matrix may also include multiplying the degree of relation between the one or more themes by an electron density as a weight.

The method for renormalizing keywords in a thought system may also include obtaining a degree of relation between the one or more themes and comparing the determined degree of relation between the one or more themes and the obtained degree of relation between the one or more themes.

A method for predicting a next stable state in a thought system is also described. One or more keywords and a degree of relation between each of the one or more keywords are obtained. An N×N matrix based on the one or more keywords and the degree of relation between each of the one or more keywords are determined. A next stable state for a thought system based on a weighting of eigenstates for the N×N matrix is determined.

A method for surveying the topology in a thought system is also described. One or more keywords and a degree of relation between each of the one or more keywords are obtained. A hierarchical structure is defined that specifies relationships among the one or more themes and the one or more keywords. A shape of a first theme of the one or more themes is analyzed. Analyzing the shape of the first theme may include calculating values relating to a topology, replacing one or more minor keywords outside a threshold and patterning the topology.

An electronic device is disclosed as including means for obtaining one or more keywords and a degree of relation between each of the one or more keywords. The electronic device also includes means for determining an N×N matrix based on the one or more keywords and the degree of relation between each of the one or more keywords and means for determining (N−1) eigenfunctions having N-dimensional components and (N−1) eigenvalues from the N×N matrix using the wave equation for quantum theory. The electronic device also includes means for generating a graphical representation based on the (N−1) eigenfunctions and the (N−1) eigenvalues.

Another electronic device is also described as including means for obtaining one or more keywords and a degree of relation between each of the one or more keywords, means for determining an N×N matrix based on the one or more keywords and the degree of relation between each of the one or more keywords, and means for renormalizing the N×N matrix to determine a degree of relation as a keyword.

A yet further electronic device is described that includes means for obtaining one or more keywords and a degree of relation between each of the one or more keywords, means for determining an N×N matrix based on the one or more keywords and the degree of relation between each of the one or more keywords, and means for determining a next stable state for a thought system based on a weighting of eigenstates for the N×N matrix.

An electronic device is described that includes means for obtaining one or more keywords and a degree of relation between each of the one or more keywords, means for defining a hierarchical structure that specifies relationships among the one or more themes and the one or more keywords, and means for analyzing a shape of a first theme of the one or more themes.

A still yet further electronic device is described that includes at least one processor configured to obtain one or more keywords and a degree of relation between each of the one or more keywords, determine an N×N matrix based on the one or more keywords and the degree of relation between each of the one or more keywords, determine (N−1) eigenfunctions having N-dimensional components and (N−1) eigenvalues from the N×N matrix using the wave equation for quantum theory, and generate a graphical representation based on the (N−1) eigenfunctions and the (N−1) eigenvalues. The electronic device also includes memory in electronic communication with the at least one processor.

Another electronic device is described that includes at least one processor configured to obtain one or more keywords and a degree of relation between each of the one or more keywords, determine an N×N matrix based on the one or more keywords and the degree of relation between each of the one or more keywords, and renormalize the N×N matrix to determine a degree of relation as a keyword. The electronic device also includes memory in electronic communication with the at least one processor.

An electronic device is also described that includes at least one processor configured to obtain one or more keywords and a degree of relation between each of the one or more keywords, determine an N×N matrix based on the one or more keywords and the degree of relation between each of the one or more keywords, and determine a next stable state for a thought system based on a weighting of eigenstates for the N×N matrix. The electronic device also includes memory in electronic communication with the at least one processor.

An electronic device is further described that includes at least one processor configured to obtain one or more keywords and a degree of relation between each of the one or more keywords, define a hierarchical structure that specifies relationships among the one or more themes and the one or more keywords, and analyze a shape of a first theme of the one or more themes. The electronic device also includes memory in electronic communication with the at least one processor.

A non-transitory computer-readable medium is described having code for causing an electronic device to obtain one or more keywords and a degree of relation between each of the one or more keywords, determine an N×N matrix based on the one or more keywords and the degree of relation between each of the one or more keywords, determine (N−1) eigenfunctions having N-dimensional components and (N−1) eigenvalues from the N×N matrix using the wave equation for quantum theory, and generate a graphical representation based on the (N−1) eigenfunctions and the (N−1) eigenvalues.

A further non-transitory computer-readable medium is described having code for causing an electronic device to obtain one or more keywords and a degree of relation between each of the one or more keywords, determine an N×N matrix based on the one or more keywords and the degree of relation between each of the one or more keywords, and renormalize the N×N matrix to determine a degree of relation as a keyword.

A non-transitory computer-readable medium is described having code for causing an electronic device to obtain one or more keywords and a degree of relation between each of the one or more keywords, determine an N×N matrix based on the one or more keywords and the degree of relation between each of the one or more keywords, and determine a next stable state for a thought system based on a weighting of eigenstates for the N×N matrix.

A still yet further non-transitory computer-readable medium is described having code for causing an electronic device to obtain one or more keywords and a degree of relation between each of the one or more keywords, define a hierarchical structure that specifies relationships among the one or more themes and the one or more keywords and analyze a shape of a first theme of the one or more themes.

In an existing system for analyzing human thought, a person provides several keywords associated with a theme. The person then provides relationship information for all possible pairs of keywords. A relationship matrix is generated based on the relationship information. The matrix is then transformed to a display matrix projected on a representation space to provide a visual depiction of the relationships.

This disclosure proposes using the wave equation of quantum theory to analyze the relationship information. It also describes how to generate visual representations of the relationships and how to perform prediction and extension using quantitative analysis. The disclosure also proposes a hierarchical structure that can be used to renormalize multiple keywords in a theme to obtain a degree of relation as one keyword. It also describes surveying a topology of a thought system using the hierarchical structure.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a diagram illustrating one example 102 of keywords 104 related to a theme 106. One or more persons may input keywords 104 for a theme 106 and a degree of relation between the keywords 104. In one example, the theme 106 may be wine and the one or more keywords 104 may include alcohol, grape, polyphenol, cooking, fermentation, bottle, cork, and celebratory. The symbols ●, ◆, and ★ may represent other keywords. Additional keywords 104 may be inputted. The keywords 104 may be words that the user associates with the theme.

Figure 2:
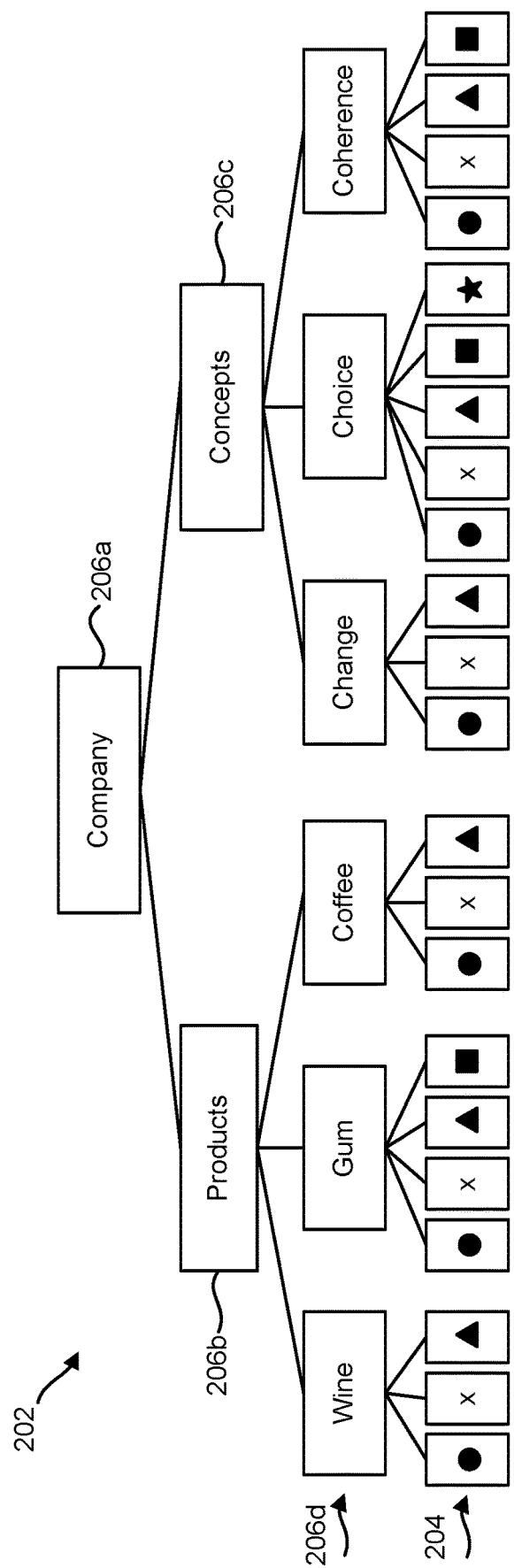
FIG. 2 is a diagram illustrating one example of a hierarchy of themes and keywords.

FIG. 2 is a diagram illustrating one example of a hierarchy 202 of themes and keywords. One or more themes and one or more keywords may be organized into a hierarchical structure 202 that is not dependent on the type of the word. All the words may have the two sides of the theme and the keyword. In this example, "Company" 206a may be a first-level theme; "products" 206b and "concepts" 206c may be second-level themes; "wine," "gum," "coffee," "Change," "Choice," and "Coherence," may be third-level themes 206d; and "○," "x," "Δ," "□," and "※," may be keywords 204. In some configurations, themes (first-, second-, third-level, etc.) may also be keywords.

Figure 3:
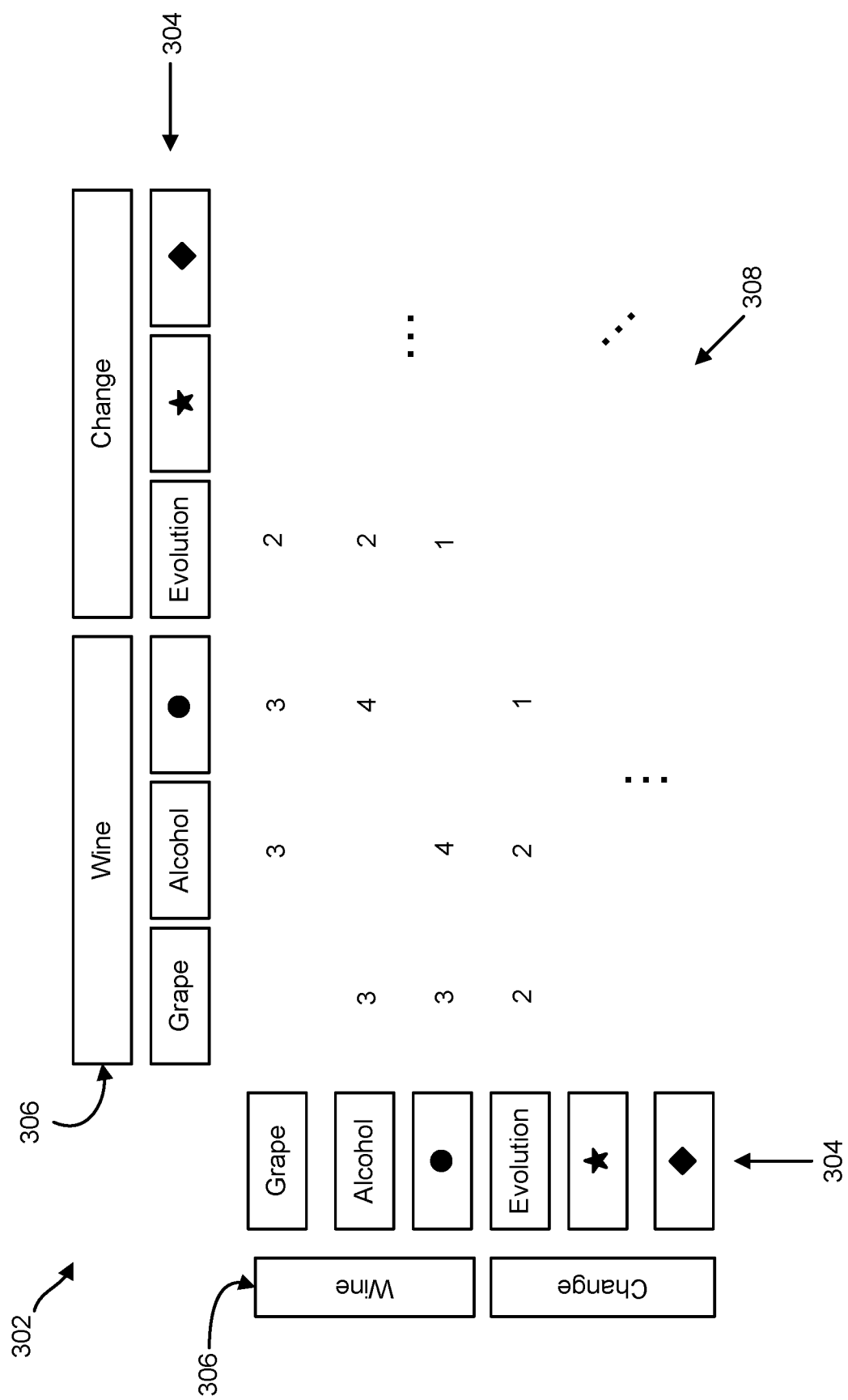
FIG. 3 is a diagram illustrating one example of an input system for specifying a degree of relation between keywords.

FIG. 3 is a diagram illustrating one example of an input system 302 for specifying a degree of relation between keywords 304. The degree of relation between the keywords 304 may be entered. For example, a user may input the degree of relation between keywords 304 using an electronic device. The degree of relation may indicate how closely a user associates two keywords 304 as being related or similar. In some configurations, a higher number may indicate a closer relationship between keywords 304 and a lower number may indicate a more distant relationship. In this example, for instance, the degree of relation between "alcohol" and "grape," may be more closely associated by the user than "alcohol" and "evolution." Theme 306 and keyword 304 may form a hierarchical structure, and degree of relation may be entered between all the keywords in the bottom layer 308.

In one configuration, assuming the input of one relationship is two seconds, one product may be input in less than five minutes; and one product and three concepts may be input in around forty minutes. However, it may be about twenty minutes if the items of the concepts are limited in advance and limited to several items.

In one configuration, some keywords 304 may be input in advance. These may be referred to as fixed keywords. These keywords 304 may be input outside of the standard input process for the other keywords. In addition, themes 306 and keywords 304 may not be limited to words. Anything may be acceptable if it can be defined. For example, sentences, images, sounds, etc., alone or in combination, may be treated as keywords. Real thing and mock in hand, or real-time experience on the spot may also be acceptable. For example, in addition to words and images on a display, keywords may also be defined by the real thing such as the mock and real-time experience.

Every theme 306 may itself be a keyword of a higher concept (theme). In this manner, the data may form a hierarchical structure. In other words, all words may combine the properties of both a theme 306 and a keyword 304. In one configuration, this may be similar, for example, to the directory structure of a personal computer (PC).

The degree of relation between all keywords across different themes may be entered in the bottom layer 308 of the hierarchical structure. The end of each branch may be referred to as the bottom layer—i.e., words that do not have a keyword in a lower layer. A nonnegative value may be entered for the degree of relation. Although negative degrees of relation are possible (and even the degree of relation being complex number), only non-negative values are shown in the examples below because it may be difficult to judge whether the degree of relation is positive or negative for human consciousness. As discussed in more detail below, a degree of relation between higher-level themes and/or keywords defined from lower-level keywords may be obtained by renormalization.

An analysis user (e.g., the user performing the analysis) may define a hierarchical structure for the contents to be investigated. The analysis user may leave themes 306 and keywords 304 for answer users (e.g., users inputting the keywords and degrees of relation) to consider. When a part of the hierarchical structure is the same each time, it may be possible to reuse the result of a previous degree of relation for purposes of shortening the investigation time.

One or more answer users may first input one or more empty themes and keywords (a vacant theme may also be a keyword for the top theme). The one or more answer users may input all the degrees of relation between the keywords in the bottom layer 308.

In one configuration, the file format for the hierarchical structure and degrees of relation may be a csv (comma separated values) file. For the contents of the data, after the definition of the hierarchical structure, numerical values symmetrical with upper triangle and lower triangle may be entered.

The table below provides one example of the contents of a csv file. The first two rows define the hierarchical structure. The next six rows define the degrees of relation between the themes and keywords.

|   |   | Wine, grape, | Wine, alcohol, | Wine, cooking, | Change, wisdom, | Change, time, | Change diversify |
|---|---|---|---|---|---|---|---|
| Wine, | grape, |   | 3, | 3, | 4, | 1, | 2 |
| Wine, | alcohol, | 3, |   | 4, | 1, | 3, | 3 |
| Wine, | cooking, | 3, | 4, |   | 2, | 4, | 2 |
| Change, | wisdom, | 2, | 2, | 1, |   | 1, | 1 |
| Change, | time, | 1, | 3, | 4, | 1, |   | 2 |
| Change, | diversify, | 2, | 3, | 2, | 1, | 2, |   |

Figure 4:
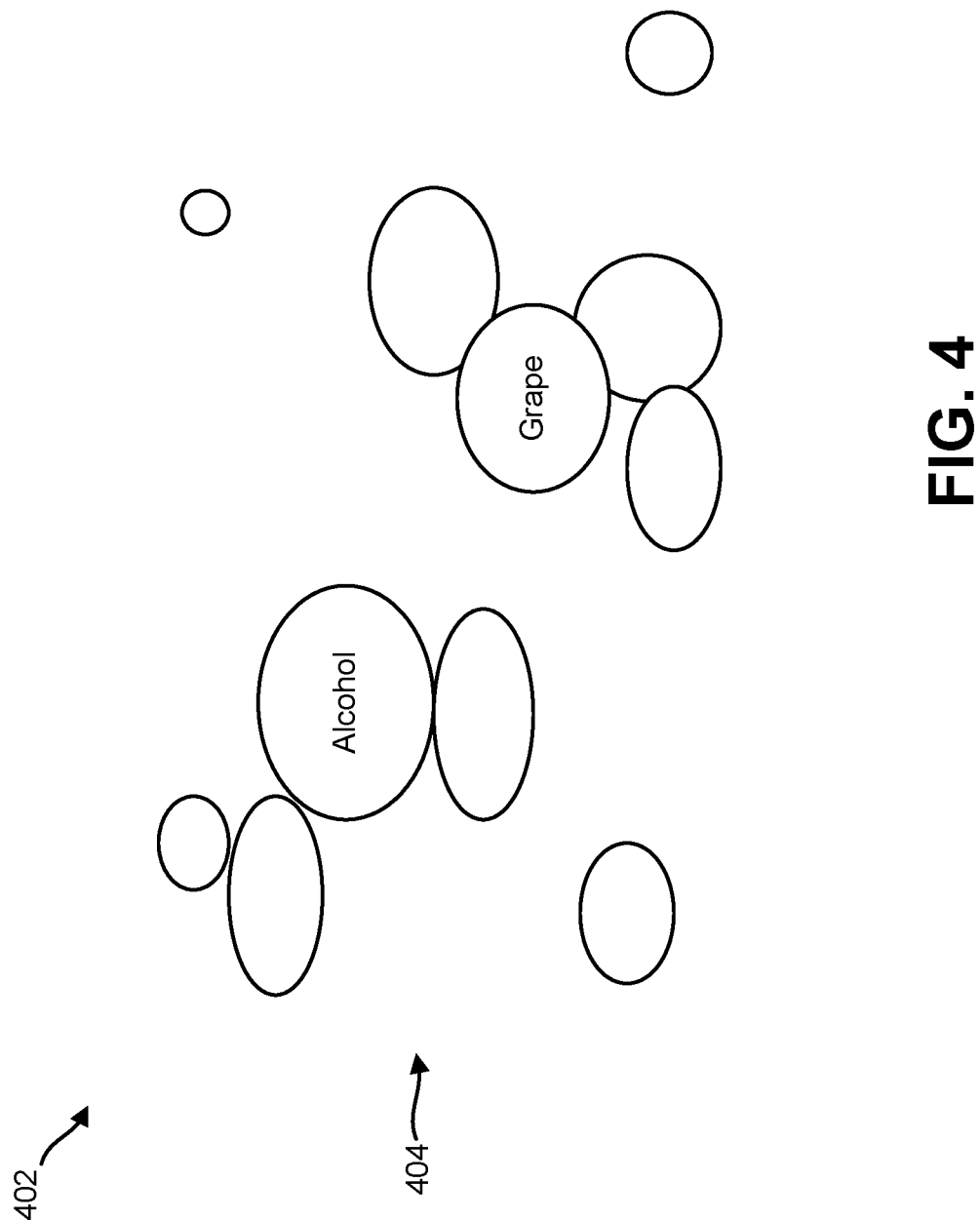
FIG. 4 is a diagram illustrating one example of an (N−1) dimensional figure representing N keywords.

FIG. 4 is a diagram illustrating one example of an (N−1) dimensional FIG. 402 representing N keywords 404. If distances between N keywords 404 are defined, a FIG. 402 in (N−1)-dimensions may be determined. This may be similar to chemical modules composed of keywords in a high-dimension space.

In one configuration, quantum theory for molecules may be applied and the FIG. 402 in (N−1) dimensions may be calculated using the following equation:

$$H^{atm}\Psi_x = E_x \Psi_x \qquad \text{Equation 1.}$$

where $H^{atm}$ may be converted data from the input data (matrix), $\Psi_x$ may be data for coordinates of the keywords in one direction x (vector), and $E_x$ may be data for characteristics of the figure in the direction x (scalar). Both the figure of a theme consisting of keywords and eigenvalues for characteristics of directions may be outputted. By inputting all degrees of relation between N keywords, an (N−1) dimensional FIG. 402 and the degree of visibility for the (N−1) direction may be output. This may be a non-trivial application of the wave equation in the quantum theory.

The input may be an N×N matrix obtained by transforming part of the original data. In one example, a value obtained by multiplying the sum of certain rows by a negative sign may be placed in the diagonal term. Wasteful information contained in the matrix may be eliminated by deformation. In the matrix after transforming, there is only one trivial eigenvector (wasteful information). The components of the eigenvector are all the same value and do not depend on the input value. This corresponds to an extra dimension when making an (N−1) dimensional figure from the input of N components. For example, input of three keywords is represented by a 3×3 matrix, while a figure created by three keywords is a 2-dimensional triangle. In this case, the direction perpendicular to the triangle in the 3-dimension is wasteful information.

An N×N matrix, $H^{atm}$, may be determined from the data of one theme consisting of the N keywords in the input csv file, $H^{org}$. This may be expressed mathematically as follows:

$$\mathcal{H}^{org}_{ij} = \begin{cases} 0 & (i = j) \\ \mathcal{H}^{org}_{ji} \geq 0 & (i \neq j) \end{cases}$$

$$\mathcal{H}^{atm}_{ij} = \begin{cases} -\sum_k \mathcal{H}^{org}_{ik} & (i = j) \\ \mathcal{H}^{org}_{ij} & (i \neq j) \end{cases}. \qquad \text{Equation 2}$$

The output may be (N−1) eigenfunctions having N-dimensional components and (N−1) eigenvalues. The (N−1)×N matrix obtained by dividing (N−1) eigenfunctions by their respective eigenvalues may provide the coordinates of the N points in the (N−1)-dimension. Also, the (N−1) eigenvalues may be a measure of ease of viewing in each direction of the (N−1) dimensions.

$$\mathcal{H}^{atm}|\phi_i^{atm}\rangle = \epsilon_i^{atm}|\phi_i^{atm}\rangle (\epsilon_i^{atm} \leq \ldots \leq \epsilon_{N-1}^{atm} \leq \epsilon_N^{atm} = 0) \qquad \text{Equation 3.}$$

In one example, the input N×N matrix $H^{atm}$ may be:

$$\begin{pmatrix} -10 & 3 & 4 & 3 \\ 3 & -6 & 2 & 1 \\ 4 & 2 & -7 & 1 \\ 3 & 1 & 1 & -5 \end{pmatrix}. \qquad \text{Equation 4}$$

$H^{atm}$ may be diagonalized and a trivial eigenfunction removed to obtain eigenvalues:

$$(-13.503 \; -8.385 \; -6.112) \qquad \text{Equation 5.}$$

and eigenfunctions:

$$\begin{pmatrix} 0.852 & 0.148 & 0.046 \\ -0.196 & -0.706 & 0.462 \\ -0.429 & 0.682 & 0.318 \\ -0.227 & -0.124 & -0.826 \end{pmatrix}. \qquad \text{Equation 6}$$

The eigenfunctions may be multiplied by weights of the eigenvalues to obtain positions in the (N−1)-dimension:

grape[0.558, 0.156, 0.067]

alcohol[−0.128, −0.744, 0.669]

cooking[−0.281, 0.719, 0.460]

bottle[−0.149, −0.130, −1.196]     Equation 7.

One benefit of the deformation may be obtaining both (N−1) eigenfunctions having N-dimensional components excluding the rotational components and (N−1) eigenvalues with uniformly negative signs. The N eigenfunctions of the original matrix may contain unnecessary one-dimensional information corresponding to the degrees of freedom of rotation. In the matrix after conversion, since the sum of each row and each column is all 0, there may always be one trivial eigenfunction with all components uniform and an eigenvalue of 0. The remaining (N−1) eigenfunctions and (N−1) eigenvalues may be used to construct an (N−1)-dimensional figure.

Figure 5:
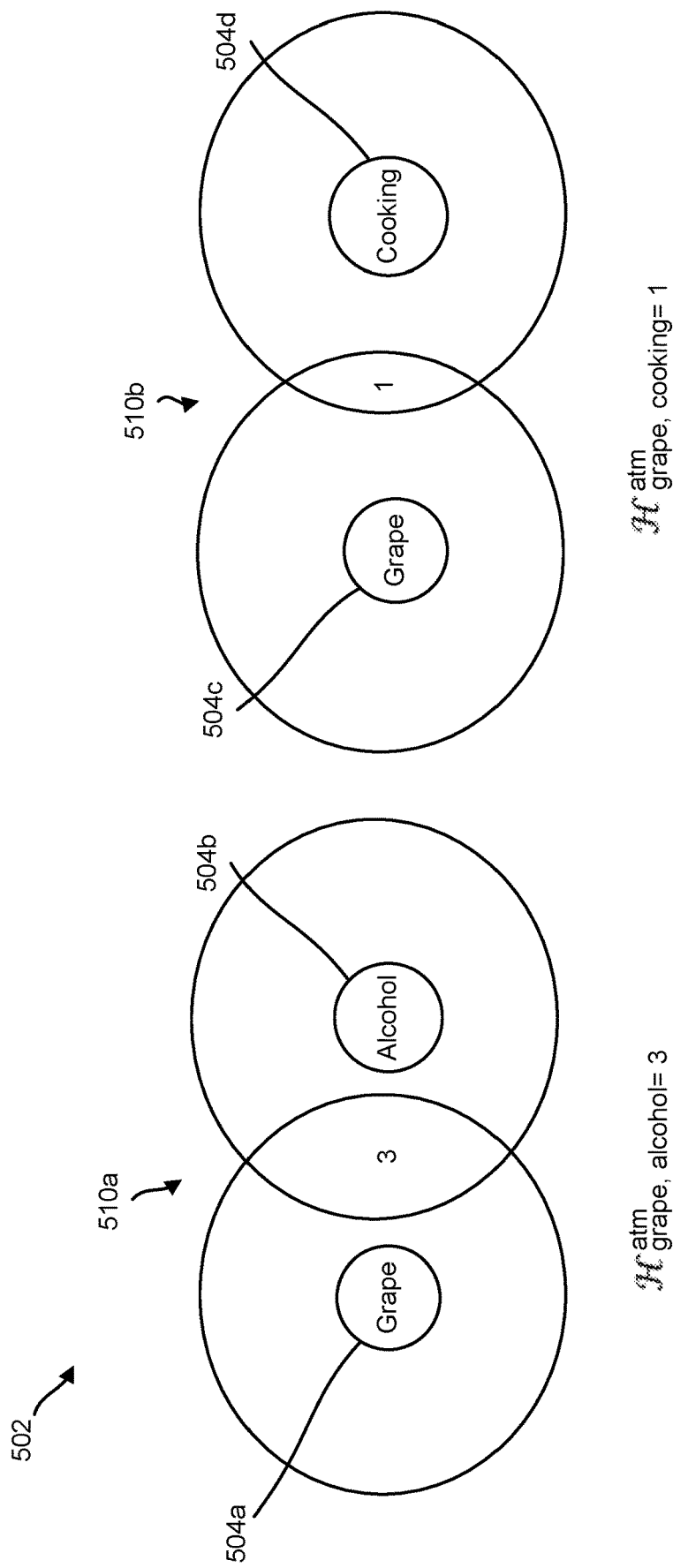
FIG. 5 is a diagram illustrating a correspondence between keywords and atoms.

FIG. 5 is a diagram 502 illustrating a correspondence between keywords and atoms. The wave equation may be an expression used to describe the eigenstate and energy (eigenvalue) of an electron. In the systems and methods described herein, a non-trivial method of calculating the position of an atom from the information of electron's position and energy may be constructed. By this method, the shape of a virtual molecule 510a, 510b composed of keywords 504 may be determined.

It may be assumed that the distance between two keywords 504 is close and/or far when the relation between two keywords is large and/or small, respectively. The input may be mathematically equivalent to the wave equation in the quantum theory. The position of the keyword may correspond to that of the atom, the relation may correspond to the distance between two atoms, and the shape of the theme may correspond to that of the molecule 510a, 510b.

In one configuration, the off-diagonal term of the wave equation may represent the ease of transfer of electrons from one atom to another atom. In the case where there is a rounded electron distribution with no nodes around one atom (this is related to non-negative degree of relation), the ease of transfer may be inversely proportional to the distance between the atoms. The point that energy is related to space information may be the point of connecting electrons and atoms.

In another configuration, when solving the wave equation using the deformed input equation, the lower the eigenvalue wave function, the more powerful the keyword with the transfer may become the main component. In other words, the keyword with the larger transfers (e.g., off-diagonal terms) may be the main component of the eigenfunction having the lower eigenvalues. Conversely, in wave functions with high eigenvalues, contributions of such components may be small. Plotting (N−1) eigenfunctions normalized to size 1 may be a regular polyhedron. By multiplying the inherent function by the reciprocal of the eigenvalue as a weight, an appropriate form may be obtained.

Figure 6:
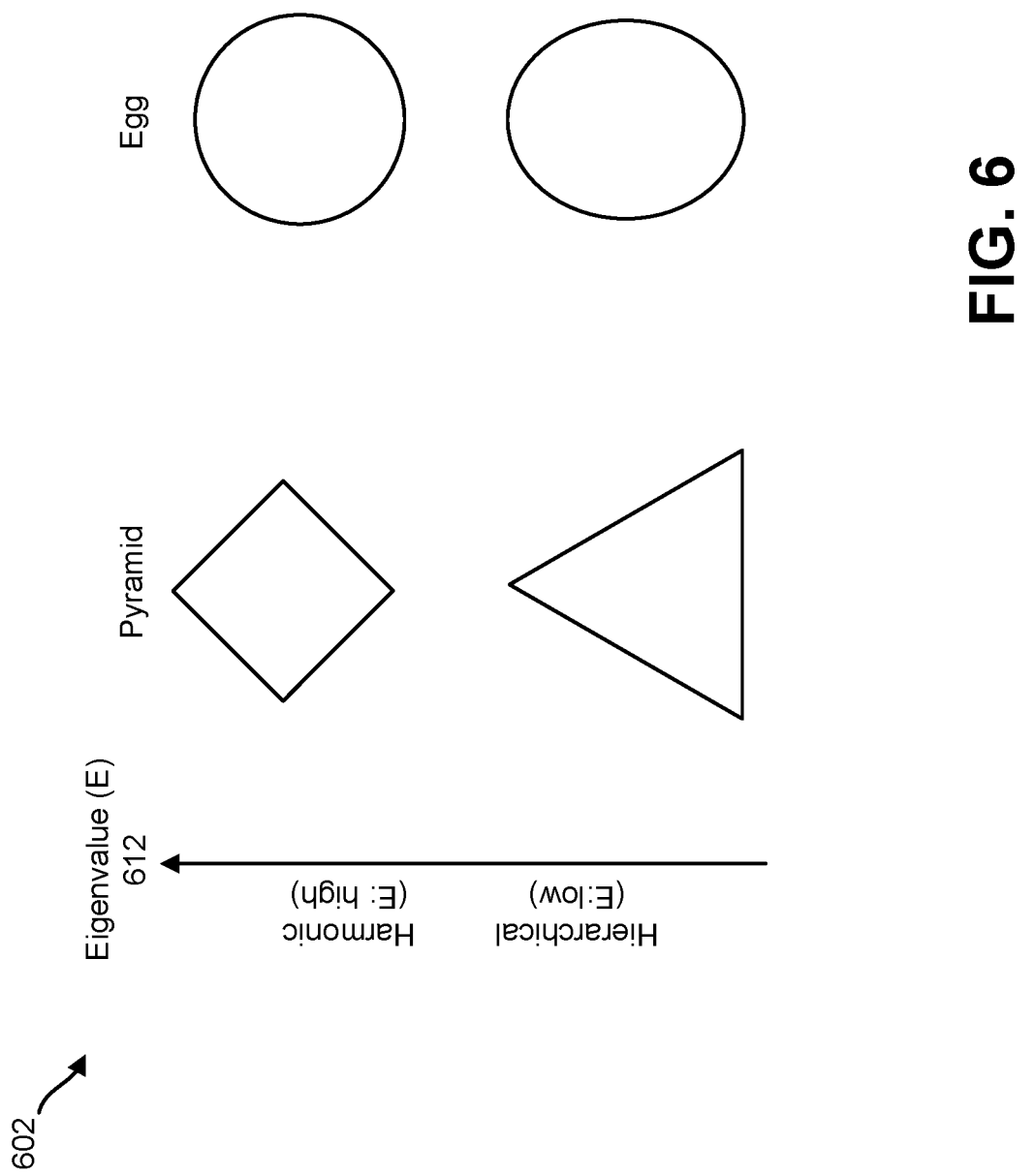
FIG. 6 is a diagram illustrating figures from multiple viewing directions.

FIG. 6 is a diagram 602 illustrating figures from multiple viewing directions. In one configuration, the eigenvalues 612 may be calculated for the harmonic and/or the hierarchical directions. The eigenvalues 612 in each direction may indicate how round or sharp in the direction. The direction with a high eigenvalue may correspond to the case of seeing pyramids and eggs from above. In that case, the shape extends radially from the center. The direction with a low eigenvalue may correspond to the side view of the pyramid or egg. This direction may be one in which shapes of features are easily observed. For example, all eigenvalues for a deformed matrix may be negative. A harmonic axis may be defined as having eigenvalues nearer to 0. A hierarchical axis may be defined as having eigenvalues with higher negative numbers. Thus, the nearer to zero (0), the more harmonic axis and the more negative, the more hierarchical axis.

Figure 7:
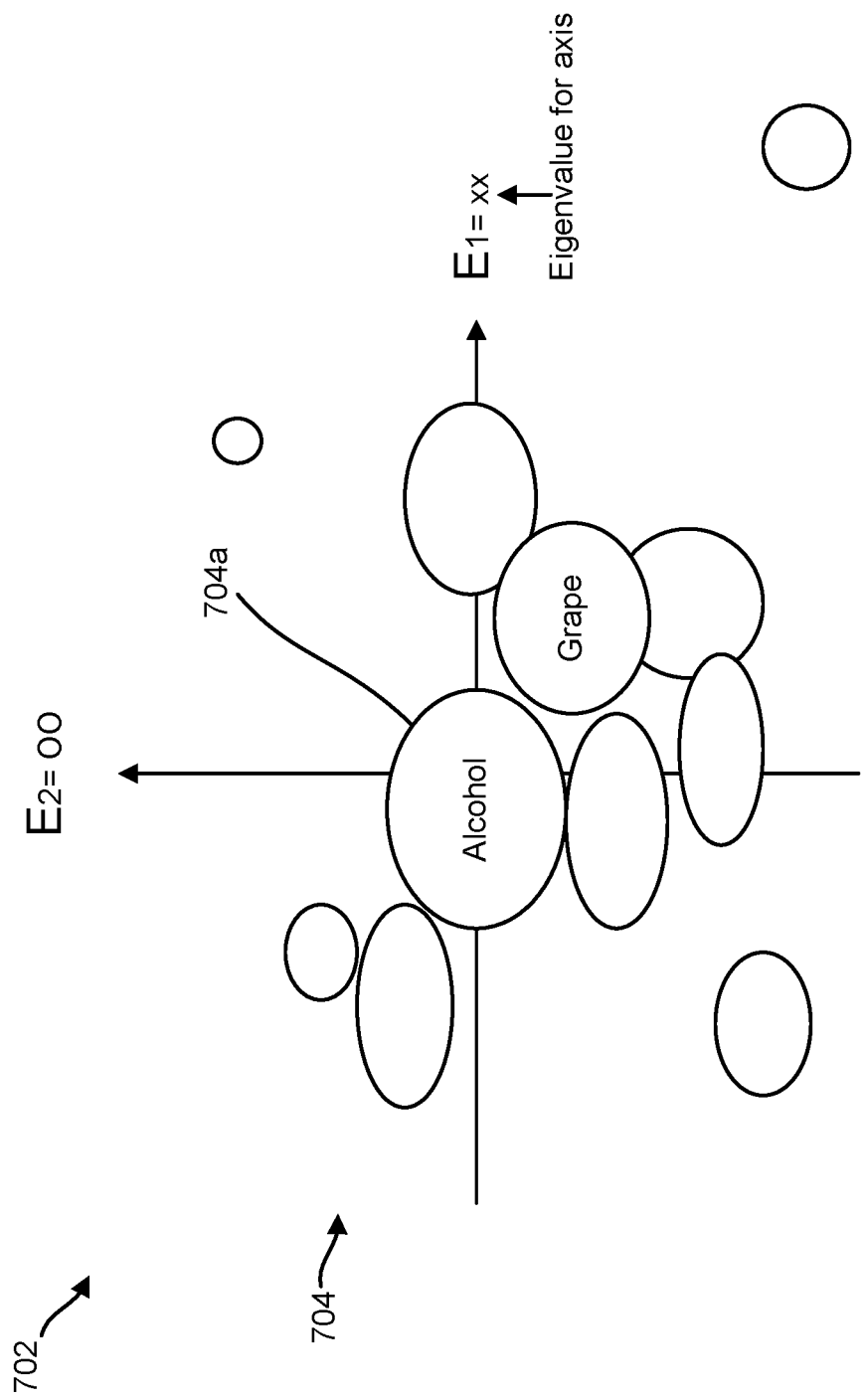
FIG. 7 is a diagram illustrating another example of an (N−1) dimensional figure representing N keywords.

FIG. 7 is a diagram 702 illustrating another example of an (N−1) dimensional figure representing N keywords 704. Two axes from the (N−1) directions may be chosen and the figure displayed. In the generated figure, an important keyword 704a may be in the center and/or far away in the harmonic and/or hierarchical axis.

As the data of the output, (N−1)-dimensional form (e.g., coordinates of N vertices of the form) may be obtained. As it may be difficult for humans to recognize high dimensions in an easy-to-understand manner, for practical reasons, two axes of interest may be selected and displayed from the (N−1) directions. Eigenvalues may be present on each axis and indicate the degree of harmonic and/or hierarchical.

The coordinates in the (N−1) dimension for i-th keyword $\psi^{atm}_i$ may be generated by multiplying (N−1) eigenfunctions excluding trivial solutions by the reciprocal weight of eigenvalues. Therefore, the degree of sharpness in each direction may correspond to the eigenvalue. The normalization constant may be chosen so that the volume in the (N−1) dimension is 1.

$$|\phi^{atm}_i\rangle = \sum_j c^{atm}_{ji} |j^{atm}\rangle \quad \text{Equation 8}$$

$$\sum_k \mathcal{H}^{atm}_{ik} c^{atm}_{kj} = \epsilon^{atm}_j c^{atm}_{ij}$$

$$\psi^{atm}_i = \sqrt[(N-1)]{\prod_k |\epsilon^{atm}_k|}$$

$$\left( \frac{1}{|\epsilon^{atm}_k|} c^{atm}_{i1}, \ldots, \frac{1}{|\epsilon^{atm}_j|} c^{atm}_{ij}, \ldots, \frac{1}{|\epsilon^{atm}_{(N-1)}|} c^{atm}_{i(N-1)} \right)$$

$$(i = 1, \ldots, N)$$

Hierarchical ← Coordinates → Harmonic.

From the harmonic viewpoint, the system may appear radially round. In the case of harmonic axis, important keywords may be located near the center. On the other hand, the surrounding keywords may extend radially from the center. The keywords of the same line may be arranged in the same direction, becoming a minor keyword in the distance.

From the hierarchical viewpoint, the system may be observed in the sharp and characteristic direction. In the case of a hierarchical axis, important keywords may be located farther away. Those with different concepts with important keywords may establish orthogonal axes. Those with the same concept may exist on the same axis.

In one configuration, multiple keywords in the theme may be renormalized and the degree of relation may be obtained as one keyword. By combining with the hierarchical structure of data, it may be possible to analyze all relations and all shapes.

Renormalization may be calculated using the N×N matrix of the input as it is. The transformation matrix used for renormalization may be calculated from the output, and mapping from N keywords to one theme may be performed. When all the keywords in the theme A have homogeneous degree of relation c with a certain keyword B in another theme, the degree of relation between the keywords A and B obtained by the renormalization may be c. This logical system may not cause inconvenience such as divergence even if repeated renormalization is performed.

In one example of renormalization, the original data may be:

$$\text{Wine} \begin{cases} \text{grape} \\ \text{alcohol} \\ \text{cooking} \\ \text{bottle} \\ \text{Change} \end{cases} \left( \begin{array}{cccc|c} 0 & 3 & 4 & 3 & 4 \\ 3 & 0 & 2 & 1 & 1 \\ 4 & 2 & 0 & 1 & 2 \\ 3 & 1 & 1 & 0 & 1 \\ \hline 4 & 1 & 2 & 1 & 0 \end{array} \right) \qquad \text{Equation 9}$$

A calculation may be made for intra-theme. The matrix $H^{ele}$ for Wine:

$$\begin{pmatrix} 0 & -3 & -4 & -3 \\ -3 & 0 & -2 & -1 \\ -4 & -2 & 0 & -1 \\ -3 & -1 & -1 & 0 \end{pmatrix} \qquad \text{Equation 10}$$

may be diagonalized to obtain eigenvalues (−7.328 0.714 1.908 4.706) and eigenfunctions $$\begin{pmatrix} 0.622 & 0.045 & -0.128 & 0.771 \\ 0.447 & -0.389 & 0.778 & -0.209 \\ 0.514 & -0.354 & -0.605 & -0.494 \\ 0.386 & 0.850 & 0.111 & -0.342 \end{pmatrix},$$

with the first column representing the ground state. The density for ground state may be obtained by squaring:

$$\begin{array}{c} \text{grape} \\ \text{alcohol} \\ \text{cooking} \\ \text{bottle} \end{array} \begin{pmatrix} 0.387 \\ 0.200 \\ 0.264 \\ 0.149 \end{pmatrix}. \qquad \text{Equation 11}$$

The four values may total 1.

Renormalization may be performed as follows:

$$\text{Wine} \begin{cases} \text{grape} \\ \text{alcohol} \\ \text{cooking} \\ \text{bottle} \end{cases} \begin{pmatrix} 4 \\ 1 \\ 2 \\ 1 \end{pmatrix}. \qquad \text{Equation 12}$$

This may be multiplied by the weight (density) to obtain Density×Relation:

$$(0.387 \ 0.200 \ 0.264 \ 0.149) \cdot \begin{pmatrix} 4 \\ 1 \\ 2 \\ 1 \end{pmatrix} = 2.425. \qquad \text{Equation 13}$$

This renormalization may represent Wine×Change.

In one configuration, analysis may be made of how it spreads when one droplet of an electron drips to a molecule composed of keywords, and it may be renormalized by the result of the distribution.

In order to execute the renormalization, the wave equation of electrons may be analyzed on the molecule (theme) of the determined space arrangement. The negative sign of the original data may be used for the wave equation of electrons. The electron density of the ground state may be calculated from the wave function of the ground state. This distribution of the electron may represent the weight of each keyword with respect to one theme, which is 1 in total. By multiplying the degree of relation between themes by the electron density as a weight, the renormalized degree of relation between themes may be obtained as shown below.

$$\mathcal{H}_{ij}^{ele} = -\mathcal{H}_{ij}^{org} \qquad \text{Equation 14}$$

$$\hat{\mathcal{H}}^{ele} |\phi_i^{ele}\rangle = \epsilon_i^{ele} |\phi_i^{ele}\rangle$$

$$(\epsilon_i^{ele} \leq \ldots \leq \epsilon_{N-1}^{ele} \leq \epsilon_N^{ele})$$

$$|\phi_i^{ele}\rangle = \sum_j c_{ji}^{ele} |j^{ele}\rangle$$

$$\left( \sum_j |c_{ji}^{ele}|^2 = 1 \right)$$

$$\mathcal{H}_{m:n,i}^R = \sum_j |c_{m,j1}^{ele}|^2 \mathcal{H}_{m,j:n,i}^{org}.$$

In one configuration, how electrons spread on virtual chemical molecules consisting of keywords may be calculated by using the wave equation. As a result, one ground state (energetically most stable state) and (N−1) excited states may be obtained. Renormalization may be performed using the information of the most stable state. For renormalization that aggregates the degrees of freedom, in this process, transformation may be performed with a matrix obtained by squaring each element of the unitary matrix. The solution of the excited state may be used in the prediction function, which is described in relation to FIGS. 25-26.

Figure 8:
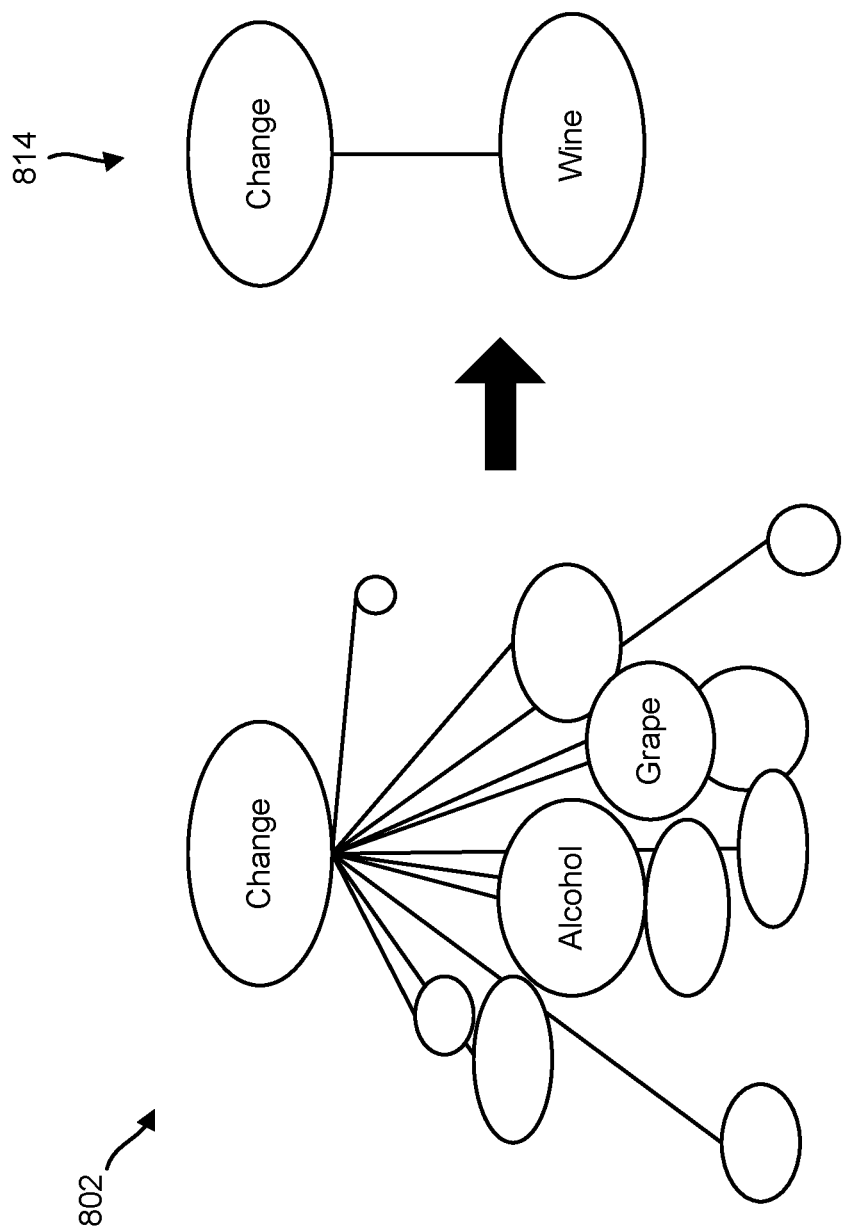
FIG. 8 is a diagram illustrating the renormalization of a keyword group to a low-dimensional theme.

FIG. 8 is a diagram 802 illustrating the renormalization of a keyword group to a low-dimensional theme 814. It may be possible to renormalize the keyword group to a low-dimensional theme. This may provide a framework without inconsistency even if renormalization is performed step-by-step.

Figure 9:
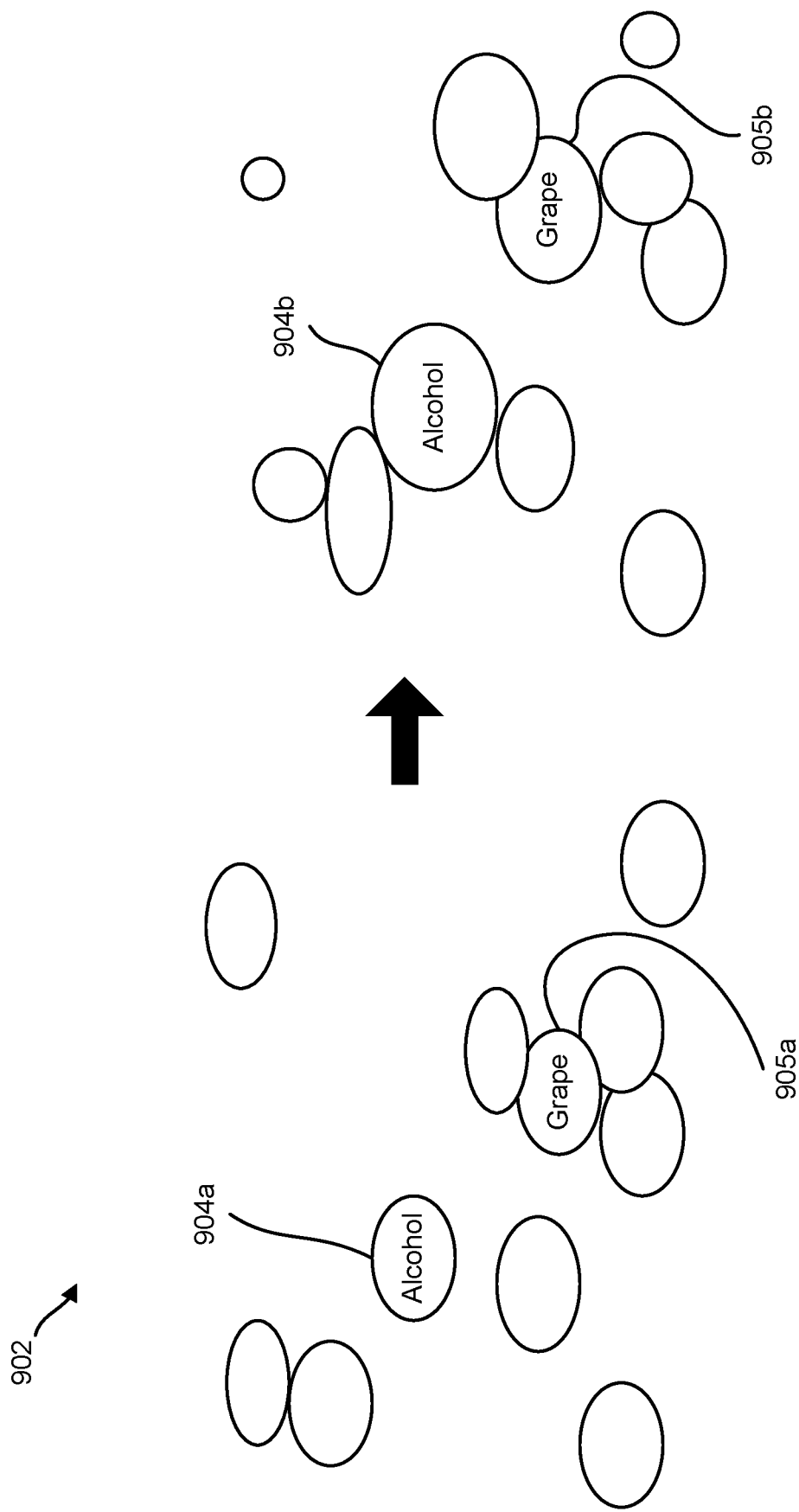
FIG. 9 is a diagram illustrating one example of how renormalization may reflect the importance of a keyword by size.

FIG. 9 is a diagram 902 illustrating one example of how renormalization may reflect the importance of a keyword by size. The size in the figure may reflect the importance. A weight obtained in the renormalization may be used. The weight may be calculated using the output in the renormalization. In other words, a calculation may be made of how much one dropped electron is on each keyword, and this may be used as the size of each keyword. As shown in FIG. 9, before renormalization, the keywords of alcohol 904a and grape 905a have a size as shown, but after renormalization these keywords of alcohol 904b and grape 905b have a different size that reflects the importance of the keywords.

Figure 10:
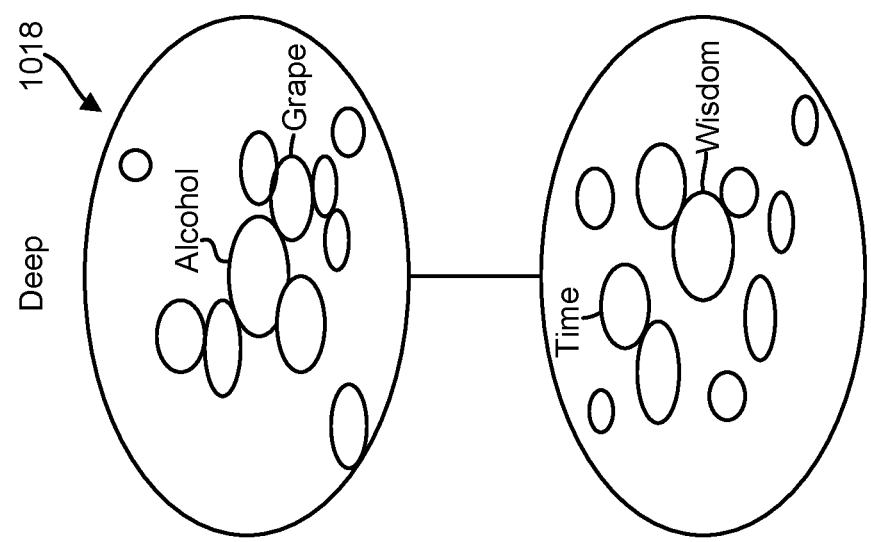
FIG. 10 is a diagram illustrating one example of analysis of surface/deep psychology.
Figure 10:
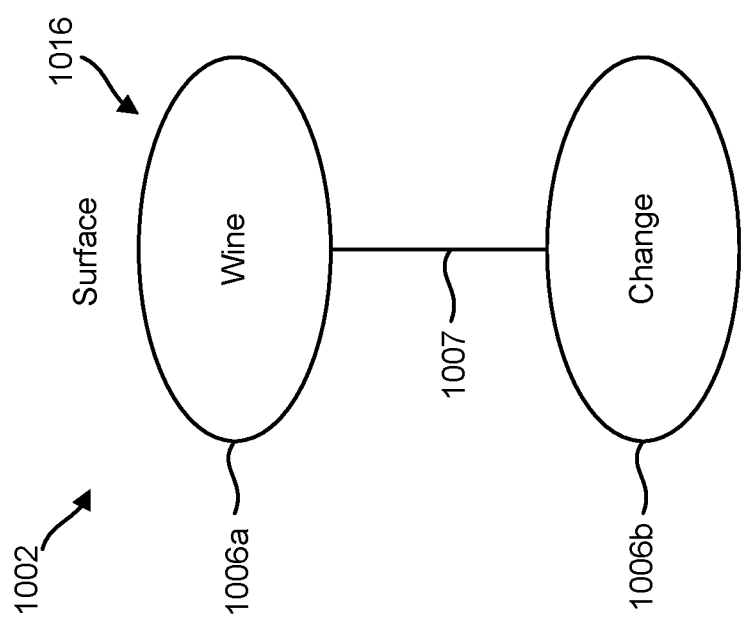

FIG. 10 is a diagram 1002 illustrating one example of analysis of surface/deep psychology. Themes 1006 may be treated like keywords and the relation 1007 between themes directly entered. By comparing the result of this case and the calculation result between themes 1006 using the renormalization, it may be possible to analyze the difference between the surface psychology 1016 and the deep psychology 1018. In deep psychology, we do not directly investigate the relation between themes. Therefore, it is possible to know the unconscious cognitive structure for a certain theme. Since the surface psychology and the deep psychology after renormalization have the same data structure, it is possible to investigate the difference in the relation and the shape of themes between them.

Figure 11:
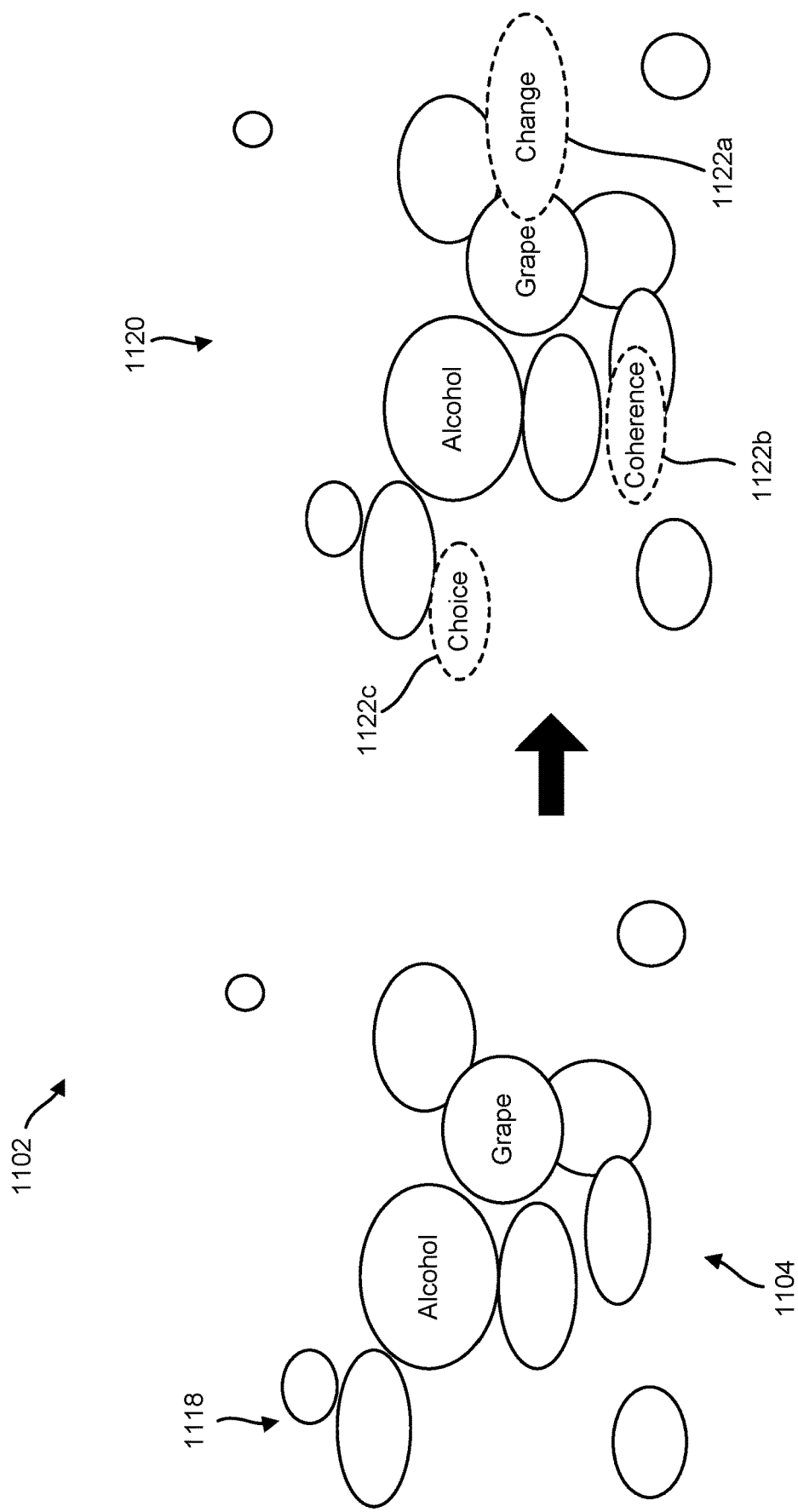
FIG. 11 is a diagram illustrating one example of analysis across different themes.

FIG. 11 is a diagram 1102 illustrating one example of analysis across different themes. One theme 1118 includes a number of keywords 1104. A center for a mixed theme 1120 may be specified. A figure of one theme 1118 may be calculated centering on another theme 1122. The position of the change 1122a, coherence 1122b and choice 1122c circles may be the closeness of the concept. The size may mean the correlation with (distance from) the whole other circles.

When analyzing across different themes, it may be advantageous to decide the viewing direction for the theme that is desired to be centered, rather than from the whole keywords. By specifying the theme of the center, other keywords on the center figure may be shown. The position may represent the positioning for each keyword of the center theme, and the size may represent the degree of relation with the whole theme. Physical processing may be based on the calculation of renormalization. A mixed theme figure may be prepared as follows. First, we consider the shape of A and B themes with M and N keywords. From the degree of relation between M+N keywords, it is possible to calculate the shape and direction of the whole A+B theme in the (M+N−1) dimension. By calculating only M keywords in A theme, we can calculate the shape and direction of A only. By projecting the coordinates of B in the (M+N−1) dimension onto the (M−1) dimension of A, we can know the B's figure against to A's figure.

Figure 12:
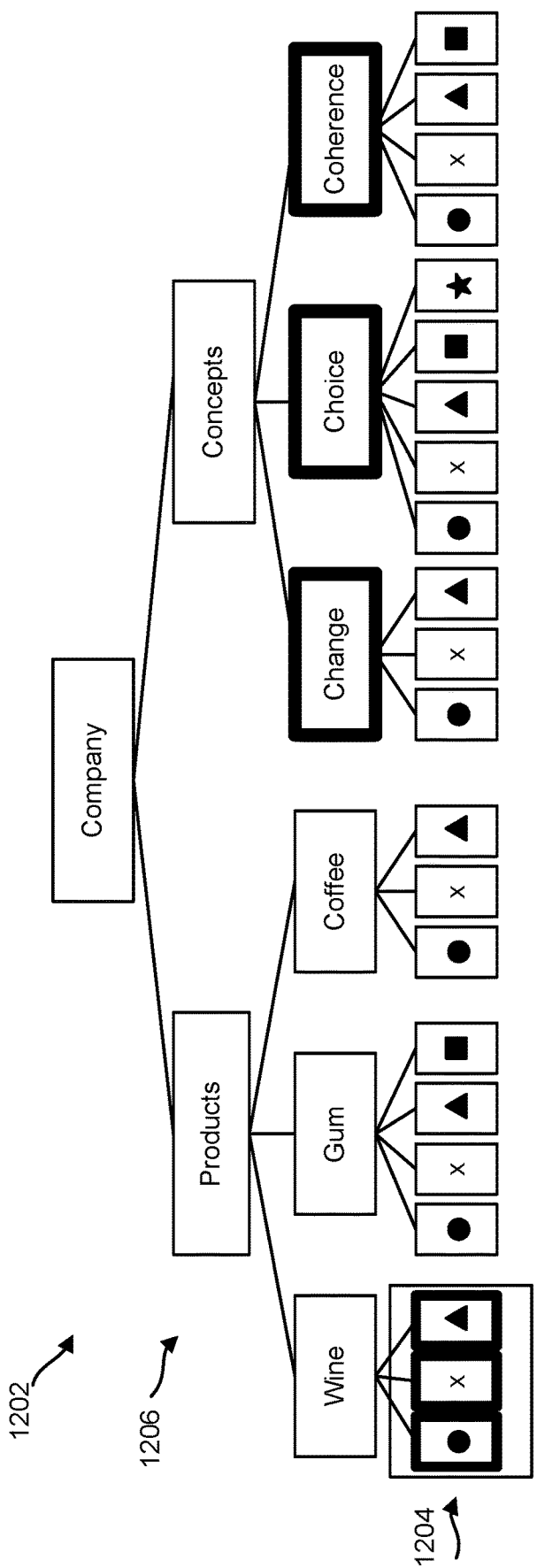
FIG. 12 is a diagram illustrating one example of an input system for selecting themes and a keyword range.

FIG. 12 is a diagram 1202 illustrating one example of an input system for selecting themes 1206 and a keyword 1204 range. Generating the figure may involve specifying the part that is desired to be a figure, including a range specification and a center specification.

The theme 1206 and keyword 1204 range desired to be analyzed may be specified in the input. Next, from within that range, the range of theme 1206 and keywords 1204 desired to be used may be specified as the center. The components surrounded by the solid line in FIG. 12 correspond to the keywords and themes specified as the center. If you do not specify a center, the direction is calculated from all keywords and themes. The figure may be analyzed to generate an output and later a prediction as shown in FIG. 13.

Figure 13:
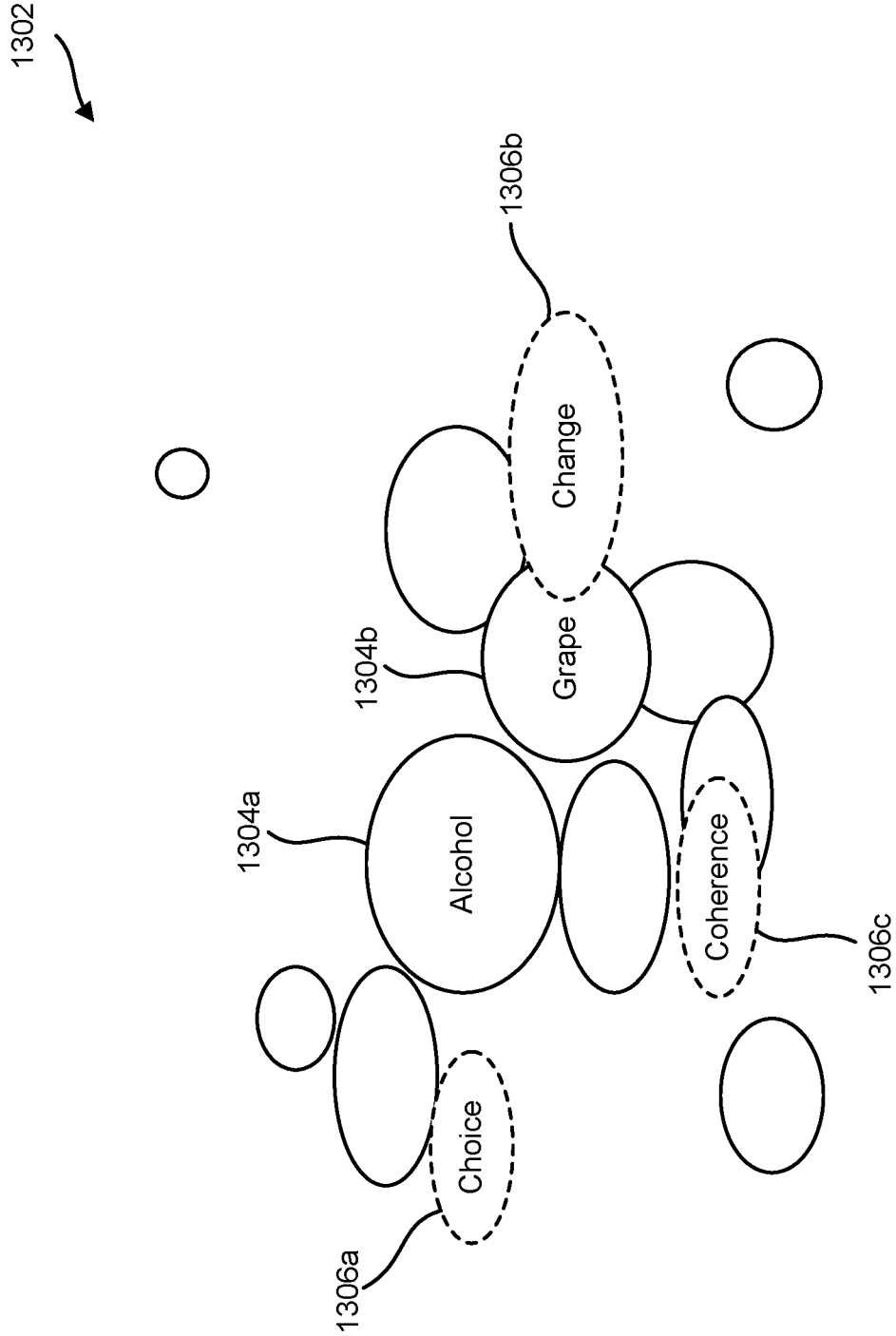
FIG. 13 is a diagram illustrating an example of an (N−1) dimensional figure representing N keywords and selected themes.

FIG. 13 is a diagram 1302 illustrating an example of an (N−1) dimensional figure representing N keywords and selected themes. The themes specified in FIG. 12 are now shown in the diagram 1302 as choice 1306a, change 1306b and coherence 1306c. They keywords specified in FIG. 12 are now shown in the diagram of FIG. 13 as alcohol 1304a and grape 1304b.

Figure 14:
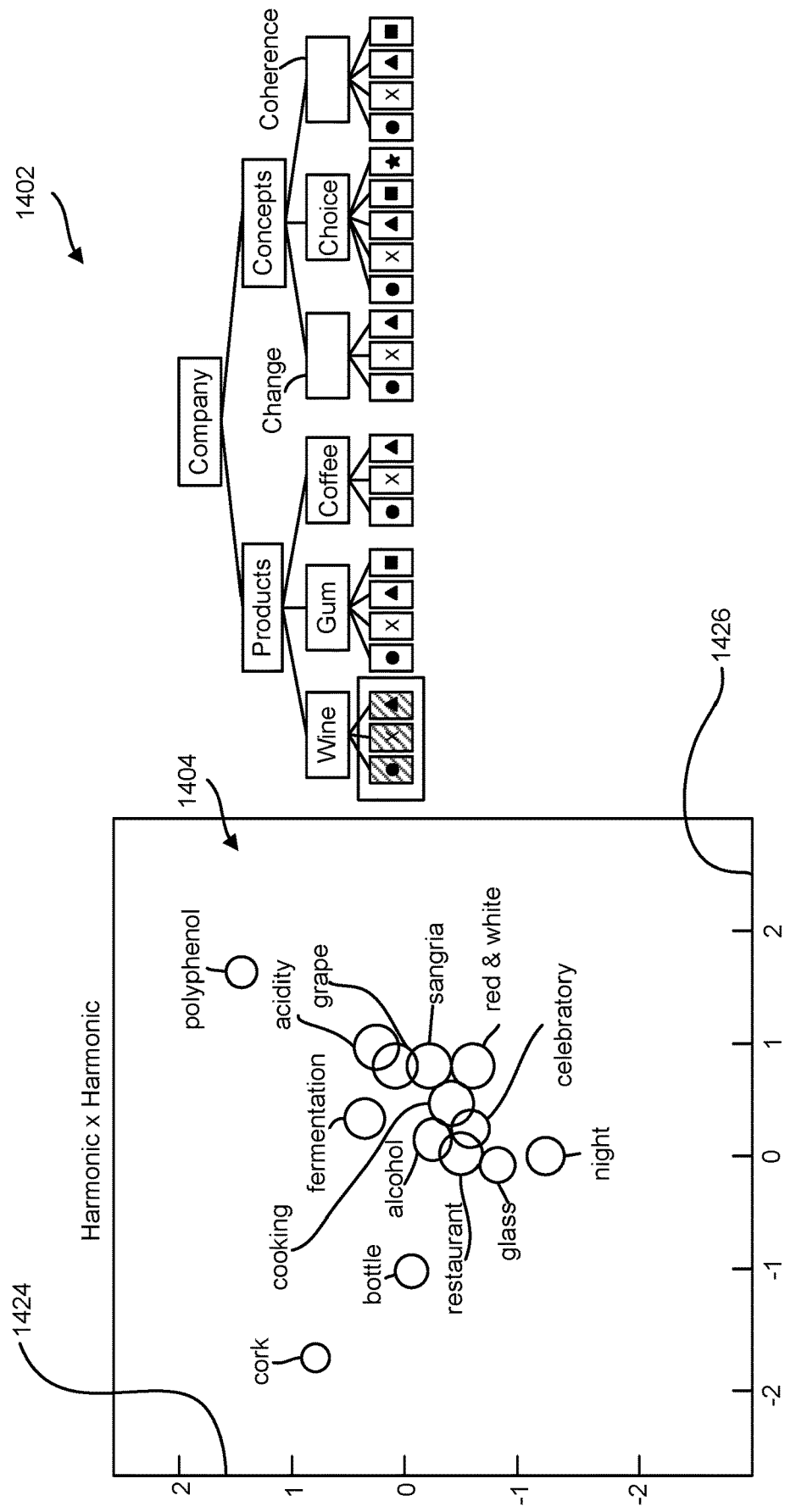
FIG. 14 is a diagram illustrating an example of an (N−1) dimensional figure representing N keywords with a harmonic vertical axis and a harmonic horizontal axis.

FIG. 14 is a diagram 1402 illustrating an example of an (N−1) dimensional figure representing N keywords 1404 with a harmonic vertical axis 1424 and a harmonic horizontal axis 1426. In this example, on the harmonic axis, important keywords may come to the center. Therefore, polyphenols and cork may be minor keywords in wine. Keywords of the same kind may line up in the same direction. For example, cork and bottle may be the same kind as the inorganic functions.

Figure 15:
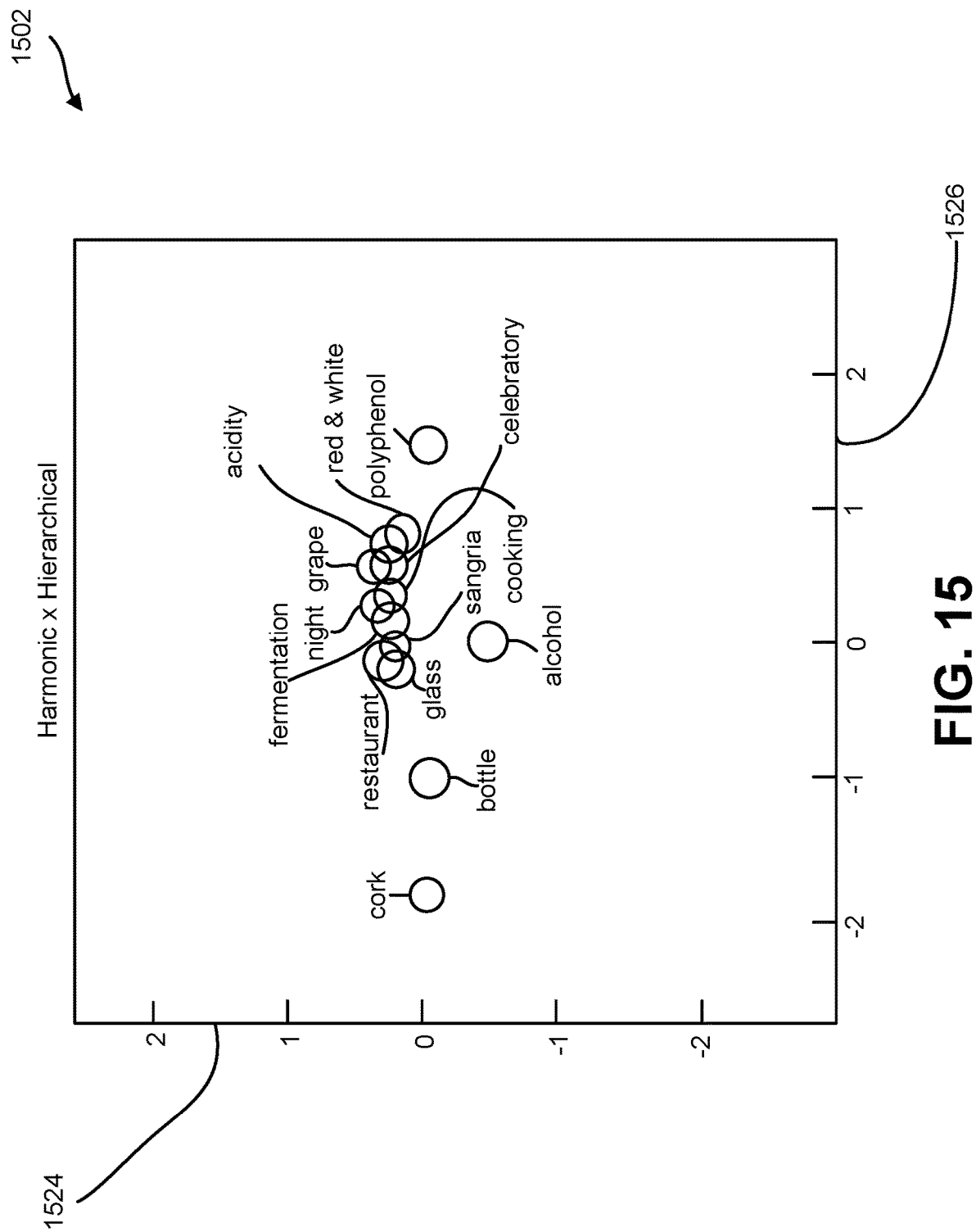
FIG. 15 is a diagram illustrating an example of an (N−1) dimensional figure representing N keywords with a hierarchical vertical axis and a harmonic horizontal axis.

FIG. 15 is a diagram 1502 illustrating an example of an (N−1) dimensional figure representing N keywords with a hierarchical vertical axis 1524 and a harmonic horizontal axis 1526. In this example, for the hierarchical vertical axis 1524, alcohol may be located at the apex. Along the harmonic horizontal axis 1526, keywords may be widely distributed.

Figure 16:
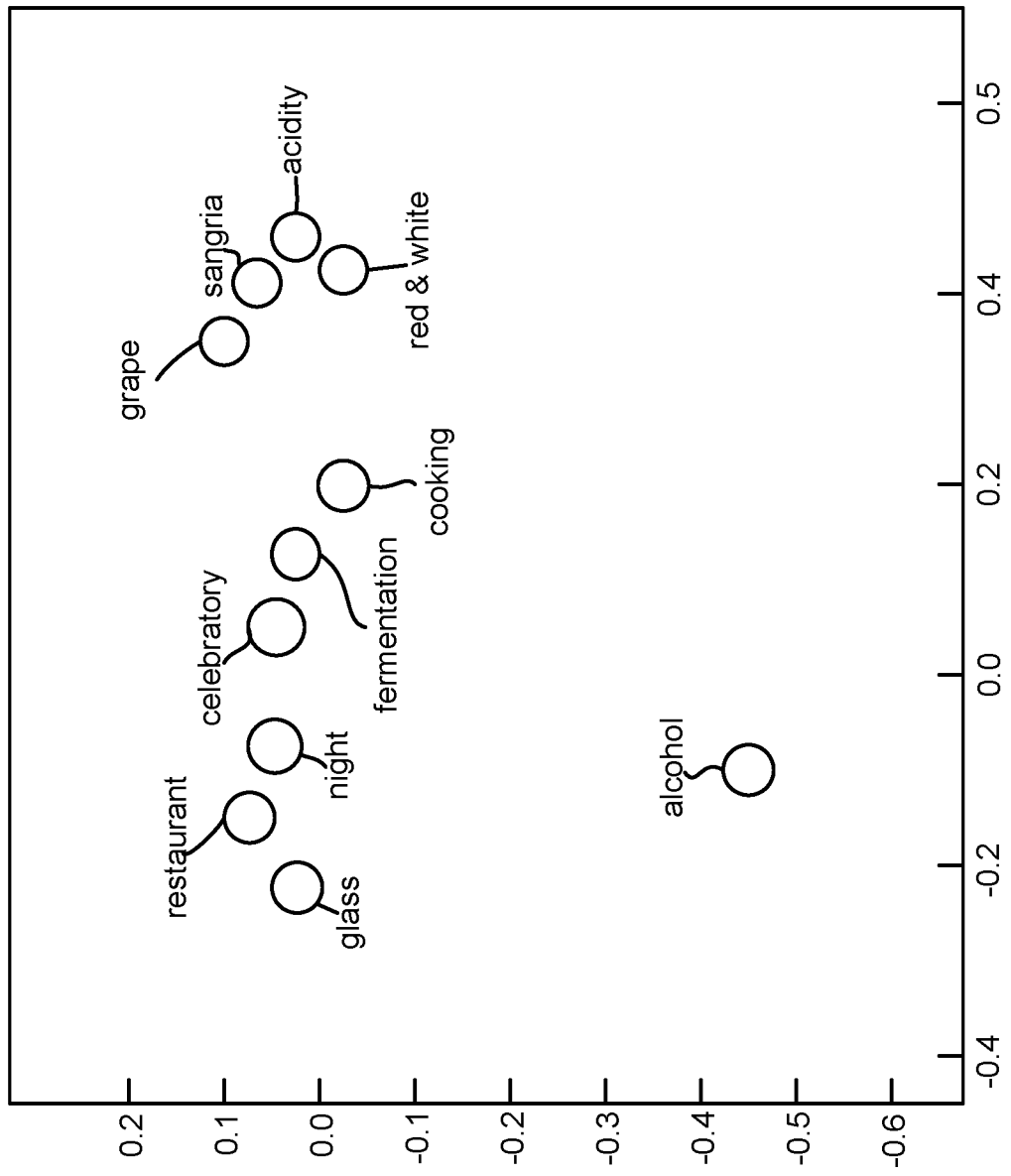
FIG. 16 is a diagram illustrating a magnified view of the (N−1) dimensional figure of FIG. 15.

FIG. 16 is a diagram 1602 illustrating a magnified view of the (N−1) dimensional figure of FIG. 15. Magnifying near the center, groups such as "glass • restaurant • night" and "grapes • sangria • acidity • red & white" may be seen.

Figure 17:
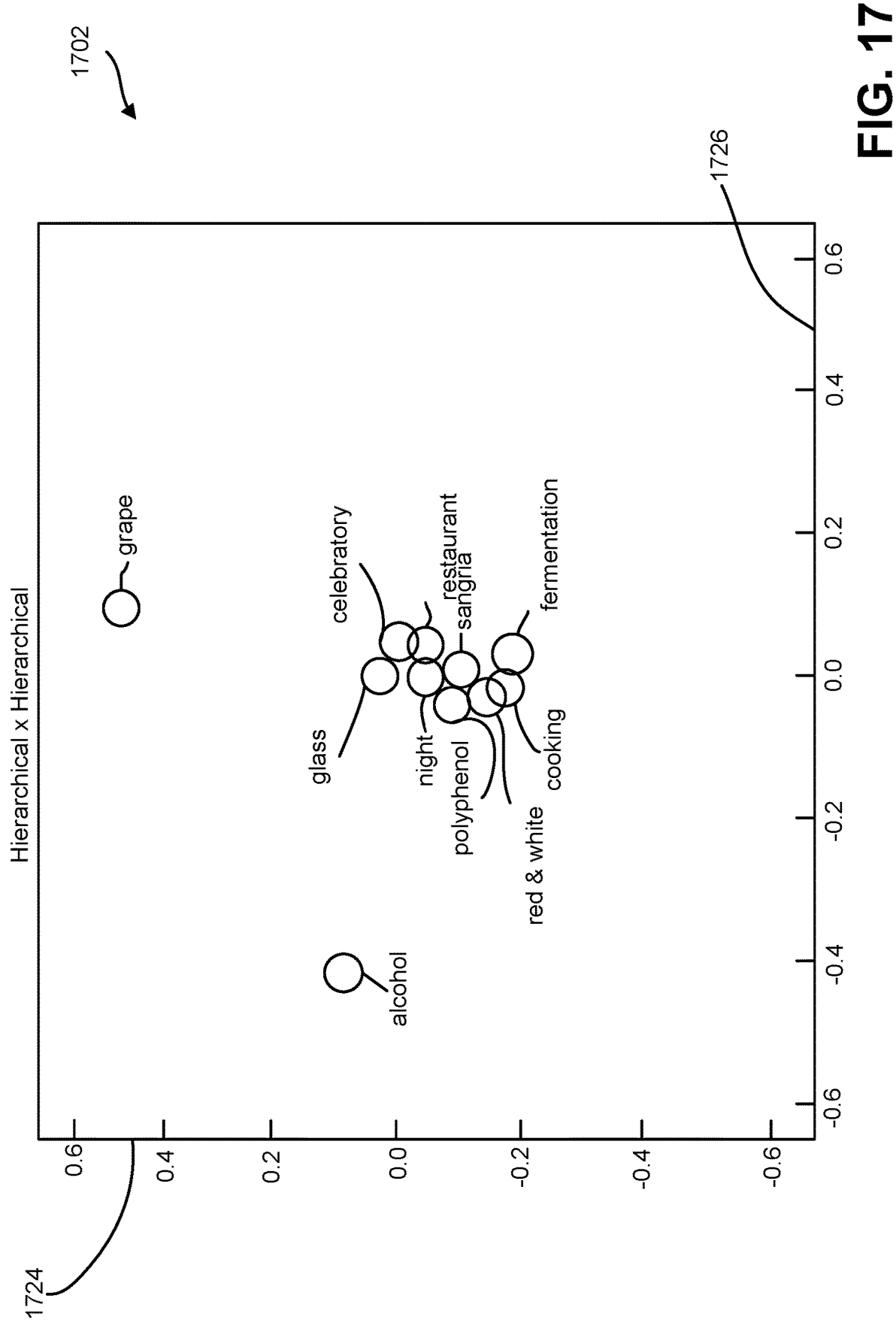
FIG. 17 is a diagram illustrating an example of an (N−1) dimensional figure representing N keywords with a hierarchical vertical axis and a hierarchical horizontal axis.

FIG. 17 is a diagram 1702 illustrating an example of an (N−1) dimensional figure representing N keywords with a hierarchical vertical axis 1724 and a hierarchical horizontal axis 1726. In this example, when displayed in hierarchical two axes, keywords dominating the system may appear outside. In the case of wine, alcohol, and grape being characteristic, they may be orthogonal and exist as concepts of different directions. When there are two important keywords paired with each other, they may appear in the opposite side of the coaxial line.

Figure 18:
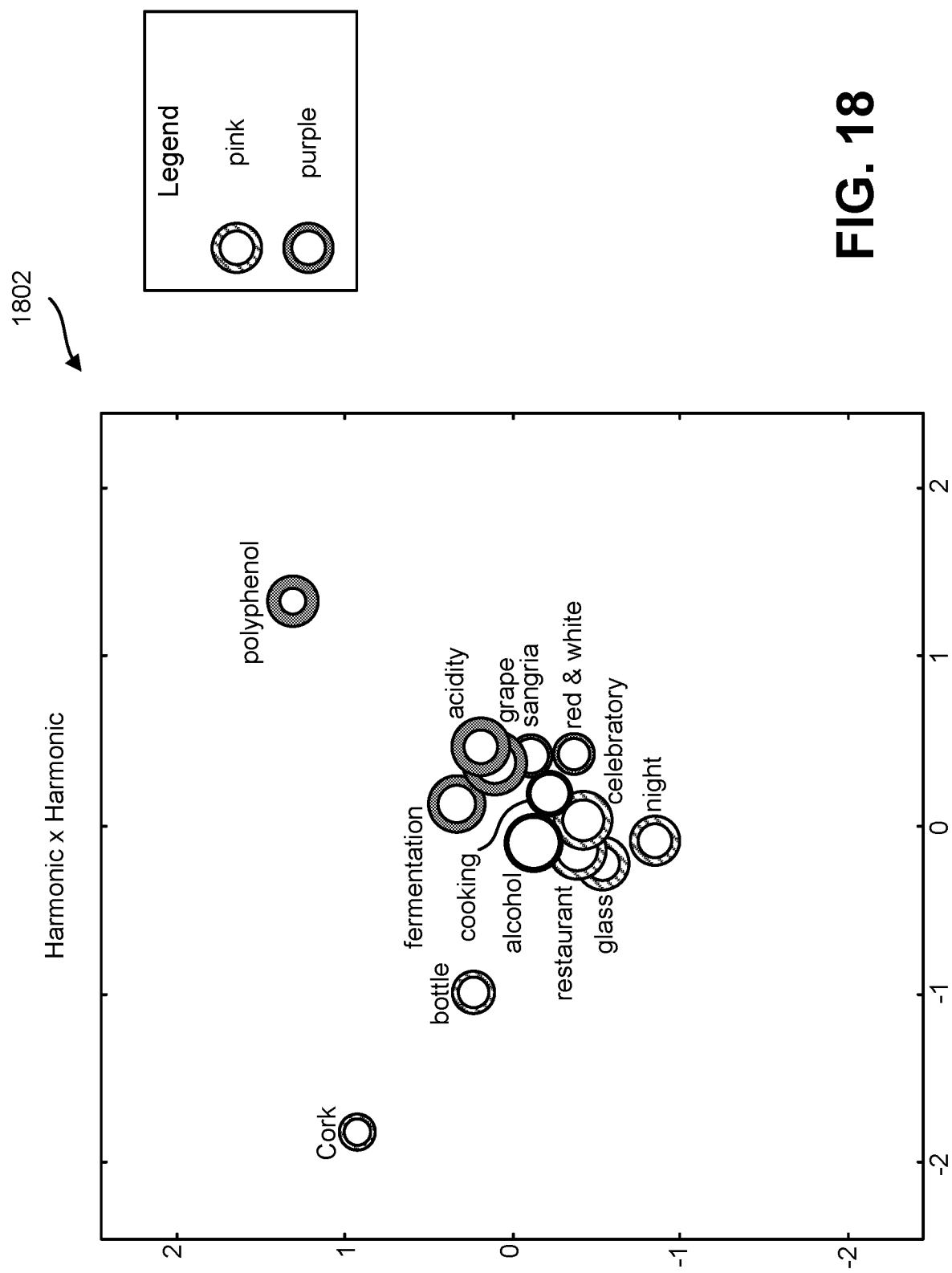
FIG. 18 is a diagram illustrating an example of analysis of a direction of change.

FIG. 18 is a diagram 1802 illustrating an example of analysis of a direction of change. In this example, it may be possible to automatically analyze the direction of change from the present situation. In the case of wine, for example, it may be divided into an inorganic • cultural direction (labeled as pink) and a foody direction (labeled as purple). The colored area, depicted by thicker surfaces of the keyword circles, may be the elongation margin for change. Although alcohol may be one of the main keywords for wine, there may be no margin for improvement.

Figure 19:
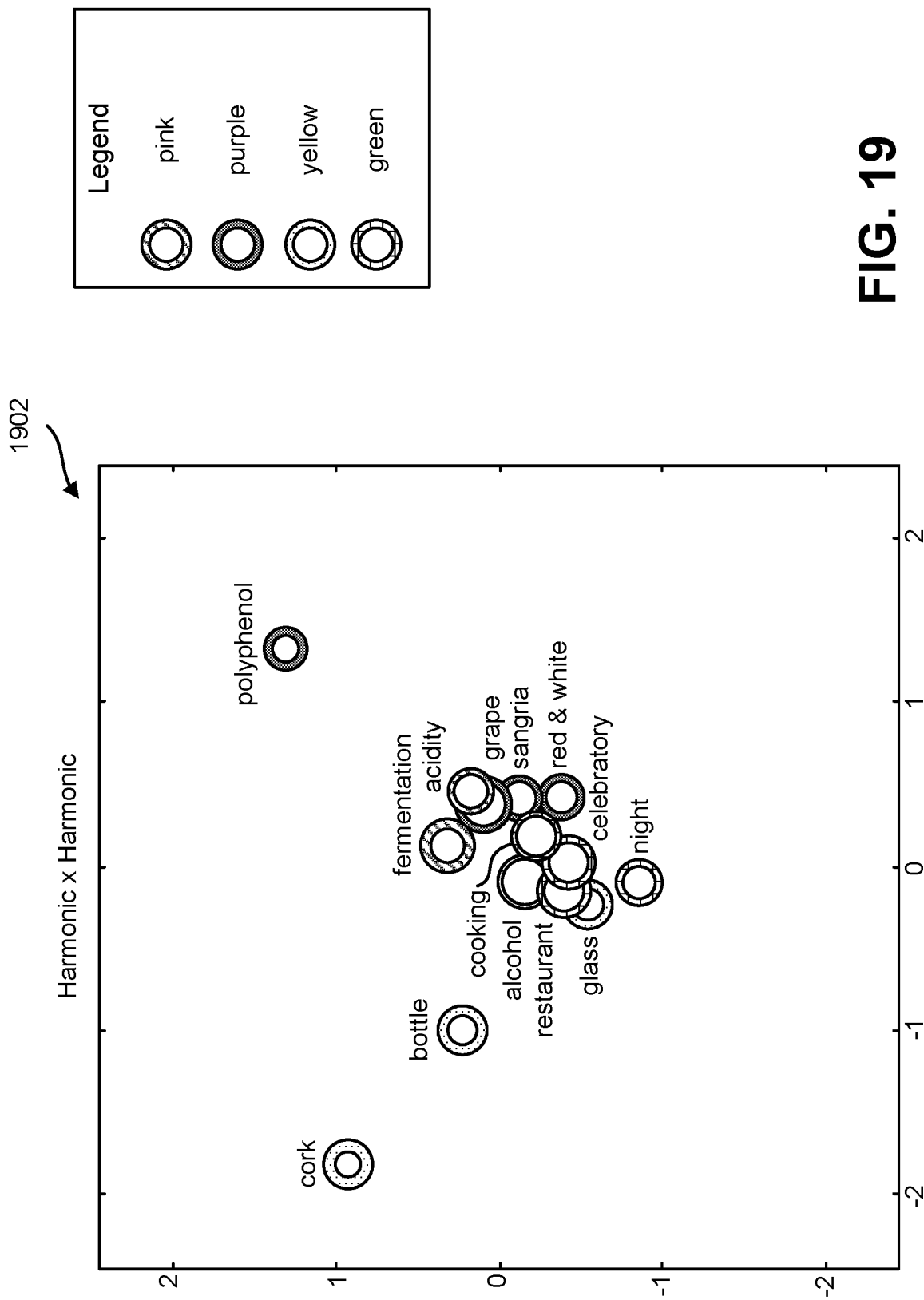
FIG. 19 is a diagram illustrating another example of analysis of a direction of change.

FIG. 19 is a diagram 1902 illustrating another example of analysis of a direction of change. It may be possible to classify direction more finely. Yellow may be the function and site, green may be the culture concerning the dish, purple may be related to grapes, and pink may be the kind of fermentation. The area of color may differ from that in the case where keywords are classified into two. For example, if emphasis is placed on functional aspects of wine, bottle and cork may have a high growth margin.

Figure 20:
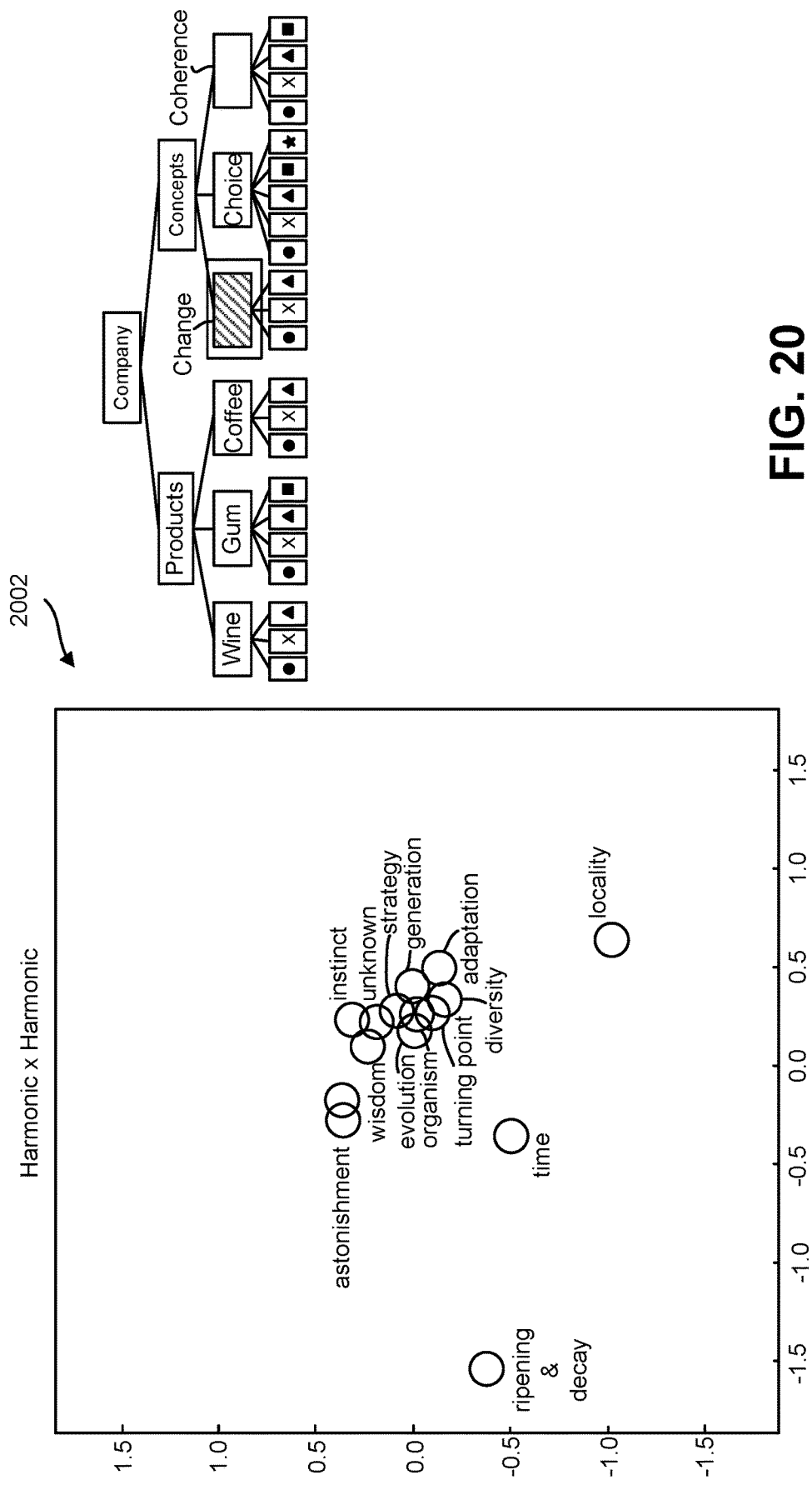
FIG. 20 is a diagram illustrating an example of analysis of a conceptual theme.

FIG. 20 is a diagram 2002 illustrating an example of analysis of a conceptual theme. In this example, "ripening & decay" may be located in the concept of the same kind as "time."

Figure 21:
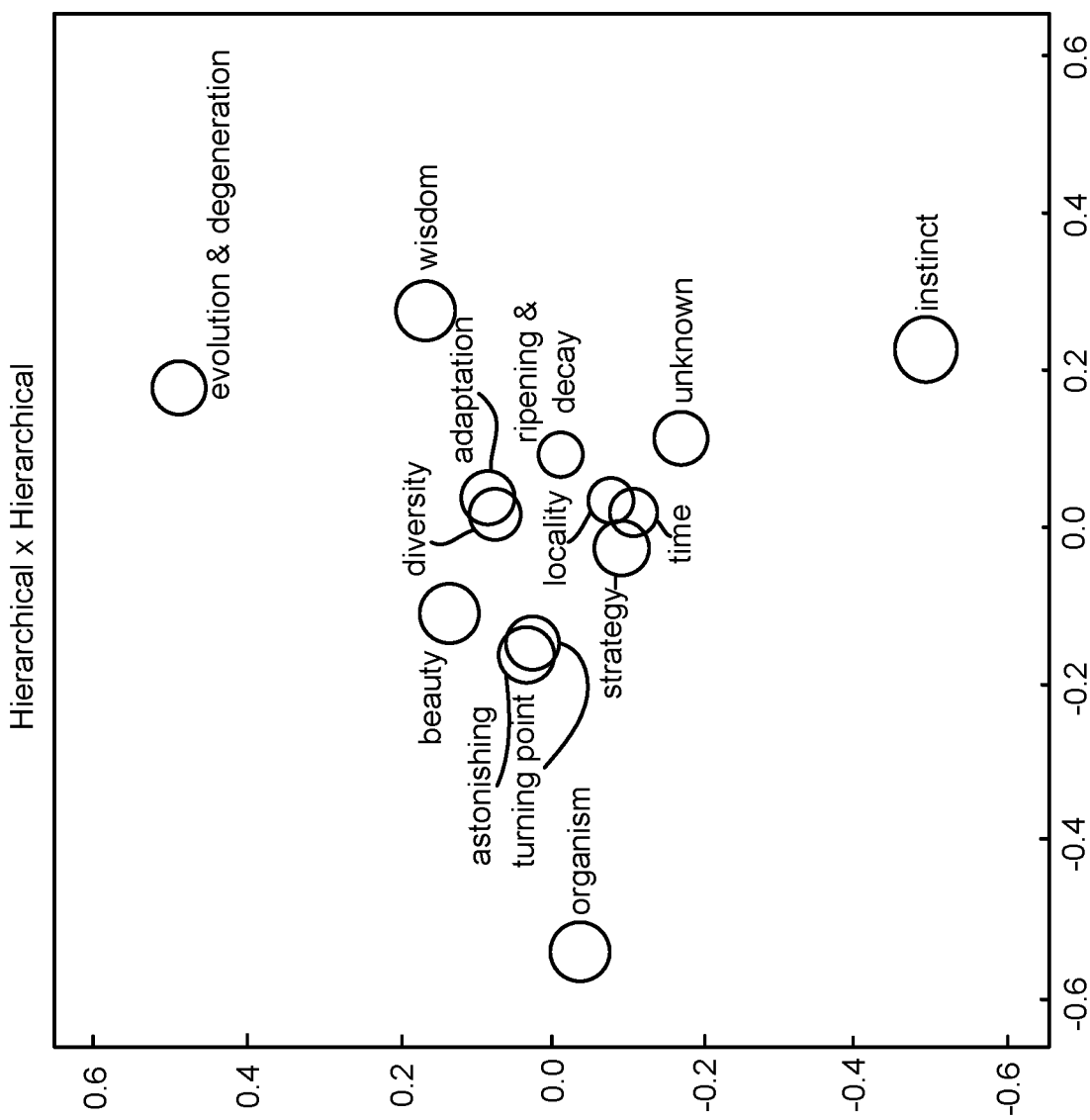
FIG. 21 is a diagram illustrating an example of renormalizing by keyword.

FIG. 21 is a diagram 2102 illustrating an example of renormalizing by keyword. In this example, unlike wine, there may be several keywords characterizing the system in "Change" (especially, "organism," "instinct," "wisdom," and "evolution & degeneration").

Figure 22:
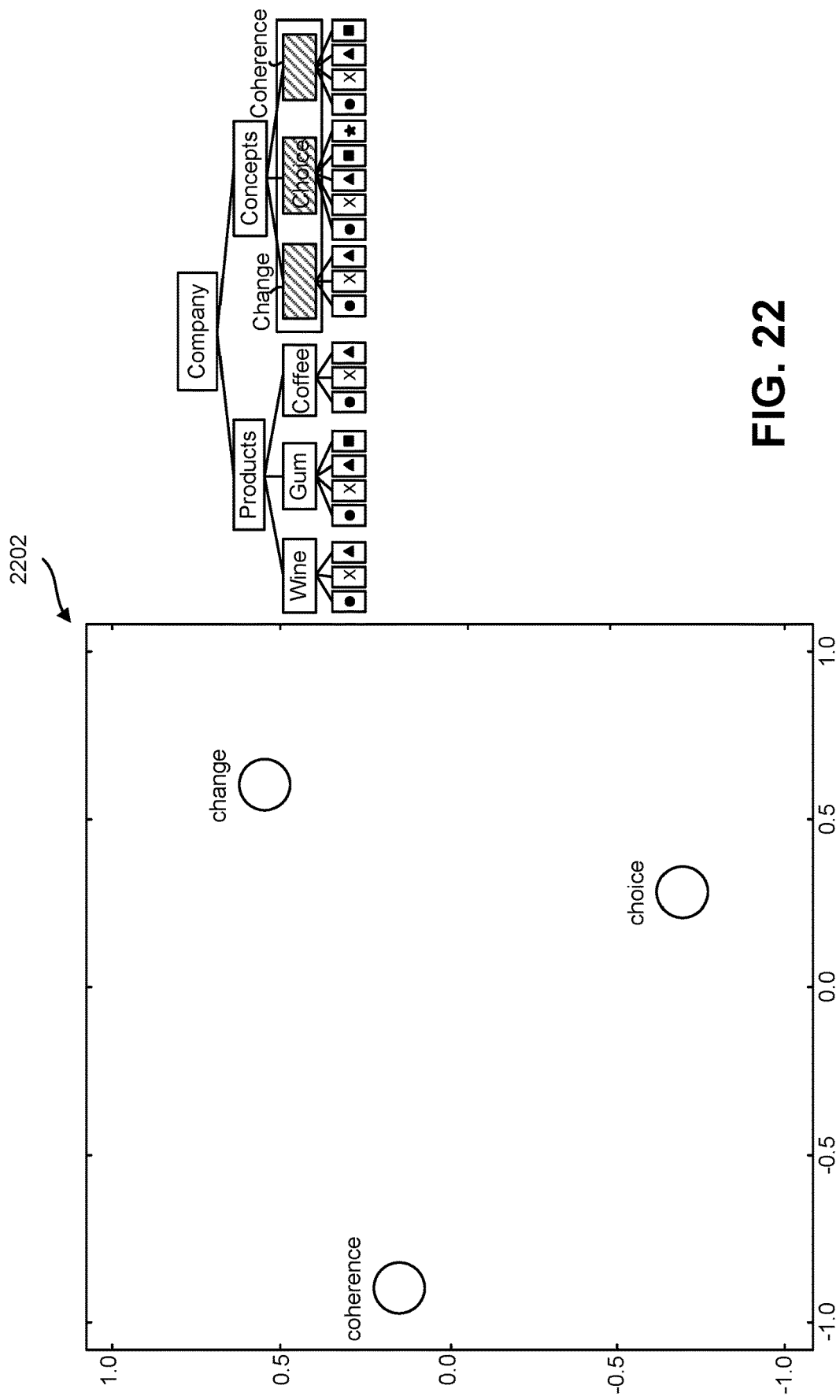
FIG. 22 is a diagram illustrating an example figure showing a degree of relation between concepts.

FIG. 22 is a diagram 2202 illustrating an example figure showing a degree of relation between concepts. In this example, by renormalizing the keywords in "Change," "Choice," and "Coherence," respectively, the degree of relation between concepts may be obtained. The concepts may be close to an equilateral triangle, although the position of "Coherence" may be slightly away. The degree of relation after renormalization may be:

Change-Choice: 1.55
Choice-Coherence: 1.26
Coherence-Change: 1.07 with an evaluation of 0-3, respectively.

$$\hat{\mathcal{H}}_m^{ele}|\phi_{m,i}^{ele}\rangle = \epsilon_{m,i}^{ele}|\phi_{m,i}^{ele}\rangle$$

$$|\phi_{m,i}^{ele}\rangle = \sum_j c_{m,ji}^{ele}|m, j^{ele}\rangle$$

$$\mathcal{H}_{mn}^R = \sum_{ij} |c_{m,i1}^{ele}|^2 |c_{n,j1}^{ele}|^2 \mathcal{H}_{m,i;n,j}^{org}.$$

Equation 15

Other analysis may be possible.

Figure 23:
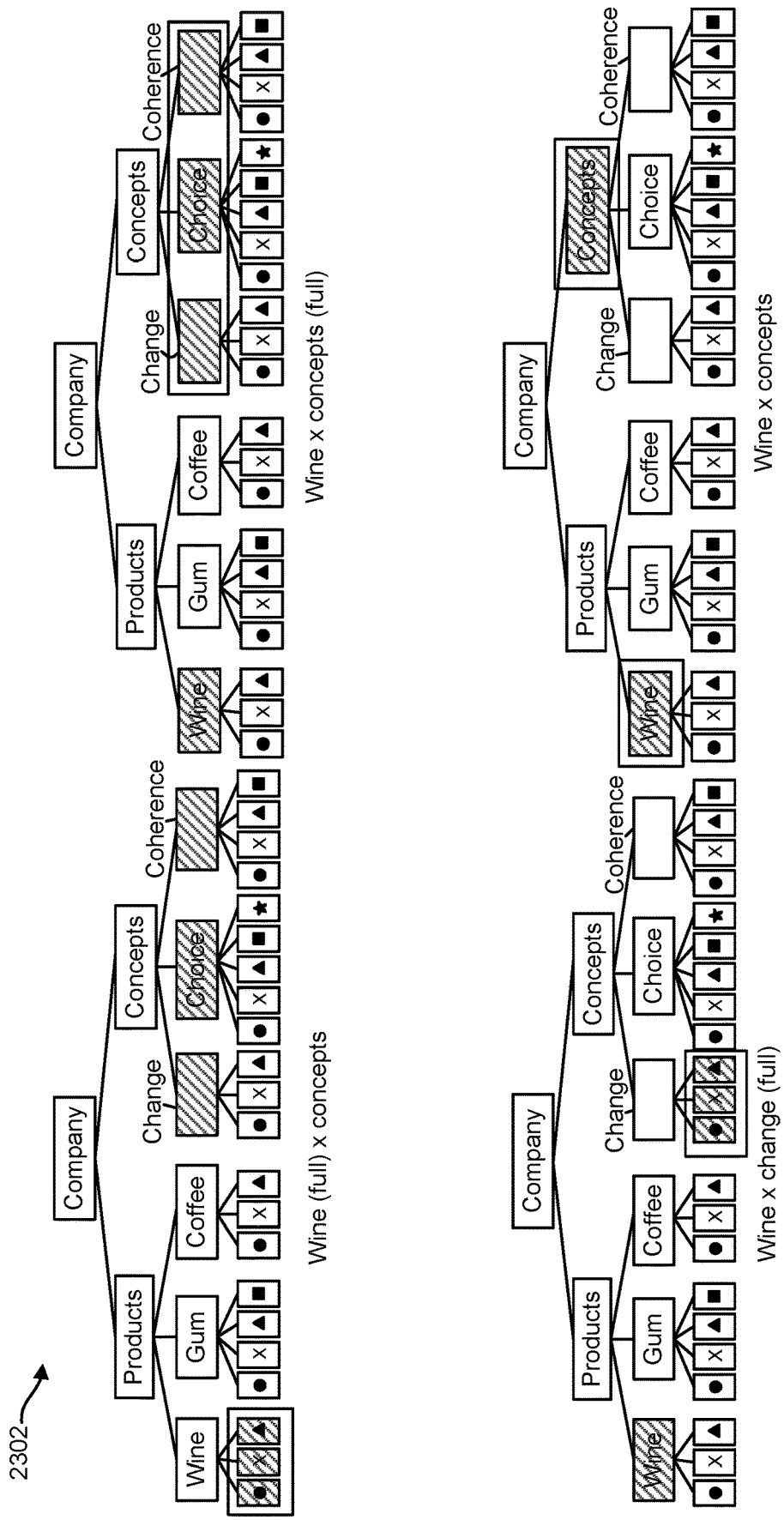
FIG. 23 is a diagram illustrating some examples of conceptual analysis.

FIG. 23 is a diagram 2302 illustrating some examples of conceptual analysis. There may be no relation that cannot be analyzed. Benefits from both renormalization and universality may be that all words are keywords as well as themes.

Figure 24:
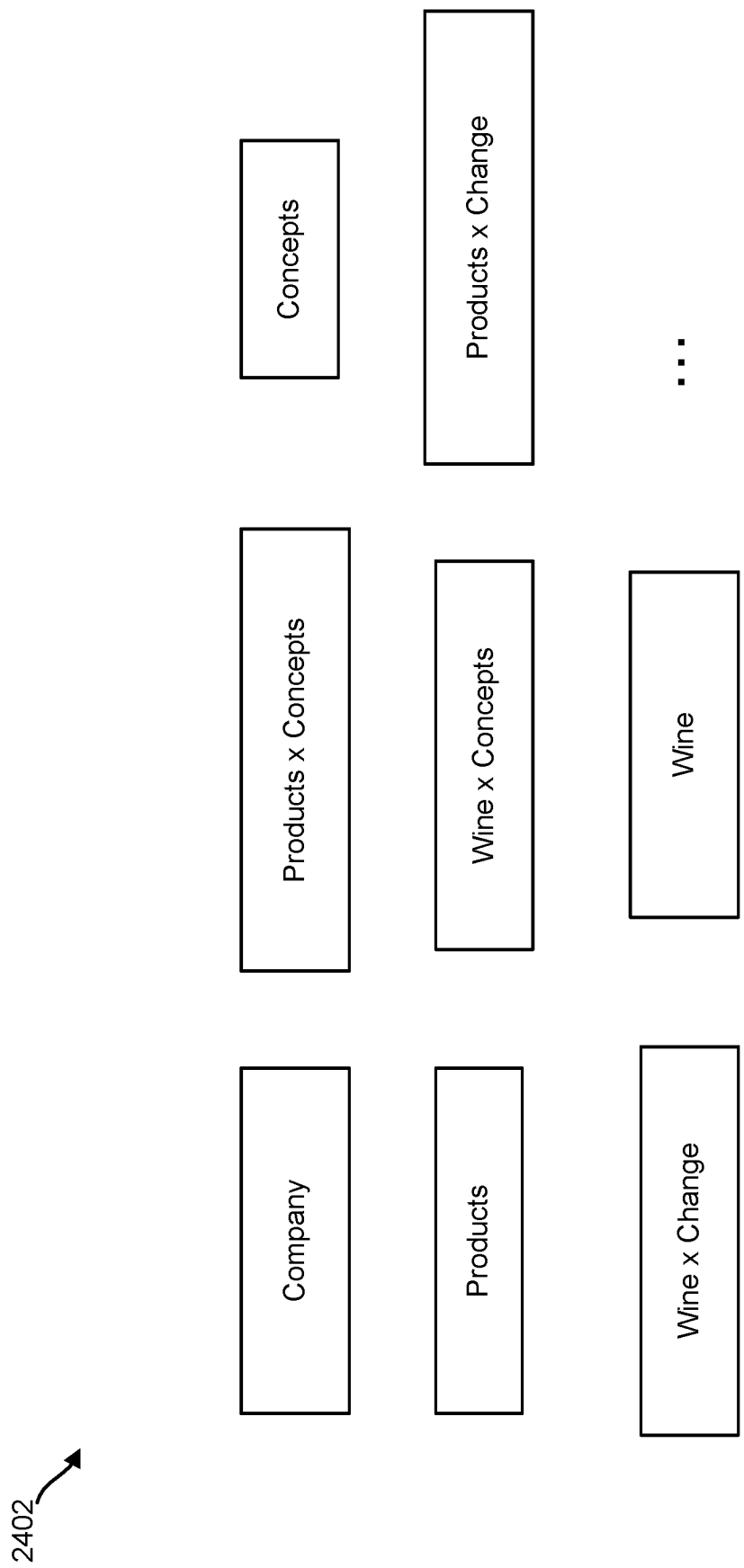
FIG. 24 is a diagram illustrating an example of analysis of the change of degree of relation with other concepts due to future change of a concept.

FIG. 24 is a diagram 2402 illustrating an example of analysis of the change of degree of relation with other concepts due to future change of a concept. The basic value may be degree of relation. Degree of relation may include a variety of information such as shape, index of its visibility, and direction of change in the future. Multiple outputs may be obtained by combining with many functions. For example, by combining the inter-theme analysis with the prediction function, the change of the degree of relation with other concepts due to future change of a certain concept may be analyzed. The meaning of FIG. 24 is that it is possible to analyze the relationship between various keywords and themes, which is the same as in FIG. 23.

Figure 25:
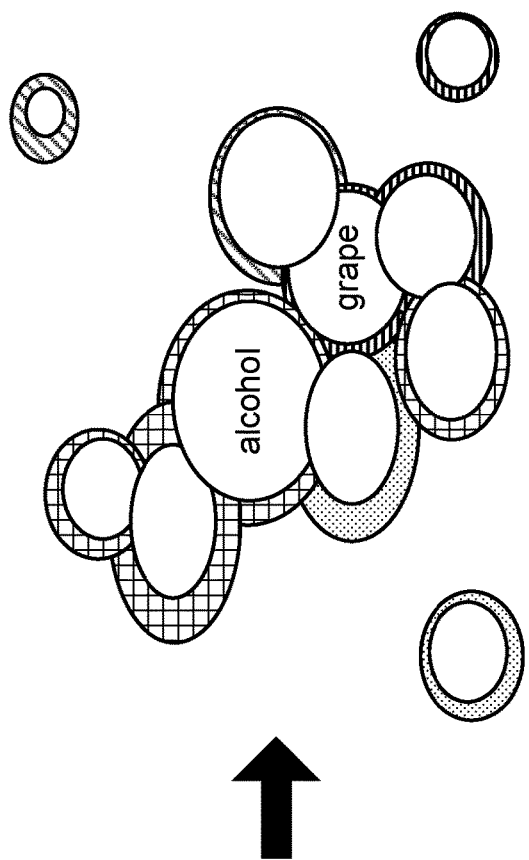
FIG. 25 is a diagram illustrating an example of prediction.
Figure 25:
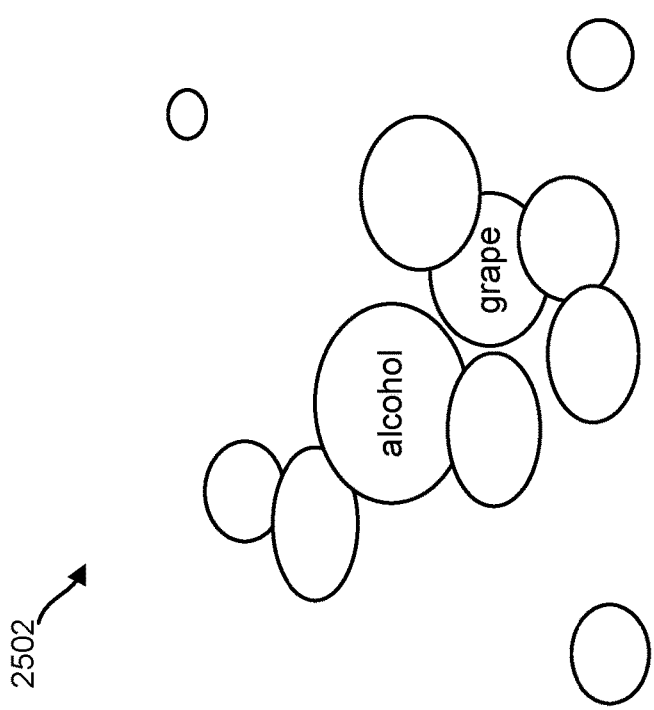
Figure 25:
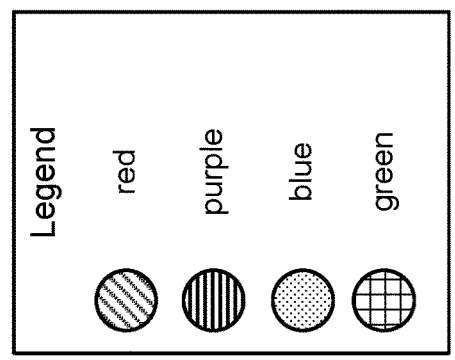

FIG. 25 is a diagram 2502 illustrating an example of prediction. The direction of evolution and its margin may be automatically calculated. The color may be the type of directionality, the size of the colored area may be the margin.

Future prediction may be performed. Although the fifth and sixth steps may not be known, the current first and second steps may be read. A droplet of an electron may be dropped on the figure of keywords. The distribution state may be now. Furthermore, by dropping only one more droplet on top of it, the next stable state may be predicted. In some examples, the eigenstate other than the most stable solution may be used in the renormalization calculation.

The flow of calculation may be as follows. $H^{ele}$ for Wine $$\begin{pmatrix} 0 & -3 & -4 & -3 \\ -3 & 0 & -2 & -1 \\ -4 & -2 & 0 & -1 \\ -3 & -1 & -1 & 0 \end{pmatrix}$$

may be diagonalized to obtain eigenvalues (−7.328 0.714 1.908 4.706) and eigenfunctions $$\begin{pmatrix} 0.622 & 0.045 & -0.128 & 0.771 \\ 0.447 & -0.389 & 0.778 & -0.209 \\ 0.514 & -0.354 & -0.605 & -0.494 \\ 0.386 & 0.850 & 0.111 & -0.342 \end{pmatrix},$$

with the second column representing the lowest excited state. The excited state may be mixed for the ground state as follows:

$$d_1 \begin{matrix} \text{grape} \\ \text{alcohol} \\ \text{cooking} \\ \text{bottle} \end{matrix} \begin{pmatrix} 0.622 \\ 0.447 \\ 0.514 \\ 0.386 \end{pmatrix} + d_2 \begin{pmatrix} 0.045 \\ -0.389 \\ -0.354 \\ 0.850 \end{pmatrix} = \begin{pmatrix} d_1*0.622 + d_2*0.045 \\ d_1*0.447 - d_2*0.389 \\ d_1*0.514 - d_2*0.354 \\ d_1*0.386 + d_2*0.850 \end{pmatrix}$$

where (d1, d2: mixing weight (coefficient)), sign: group, and density: margin.

In addition to the ground state of electrons corresponding to the distribution of the current cognitive structure, it may be possible to analyze the excited state of electrons corresponding to the distribution of stable cognitive structures riding on it. The coefficients for each keyword in the excited state may have positive and negative signs, and depending on how to hybridize with the ground state, which group of sign is reinforced and/or decreased may change. This sign may correspond to a group of colors, and the difference in electron density after mixing may correspond to the radius of color.

Figure 26:
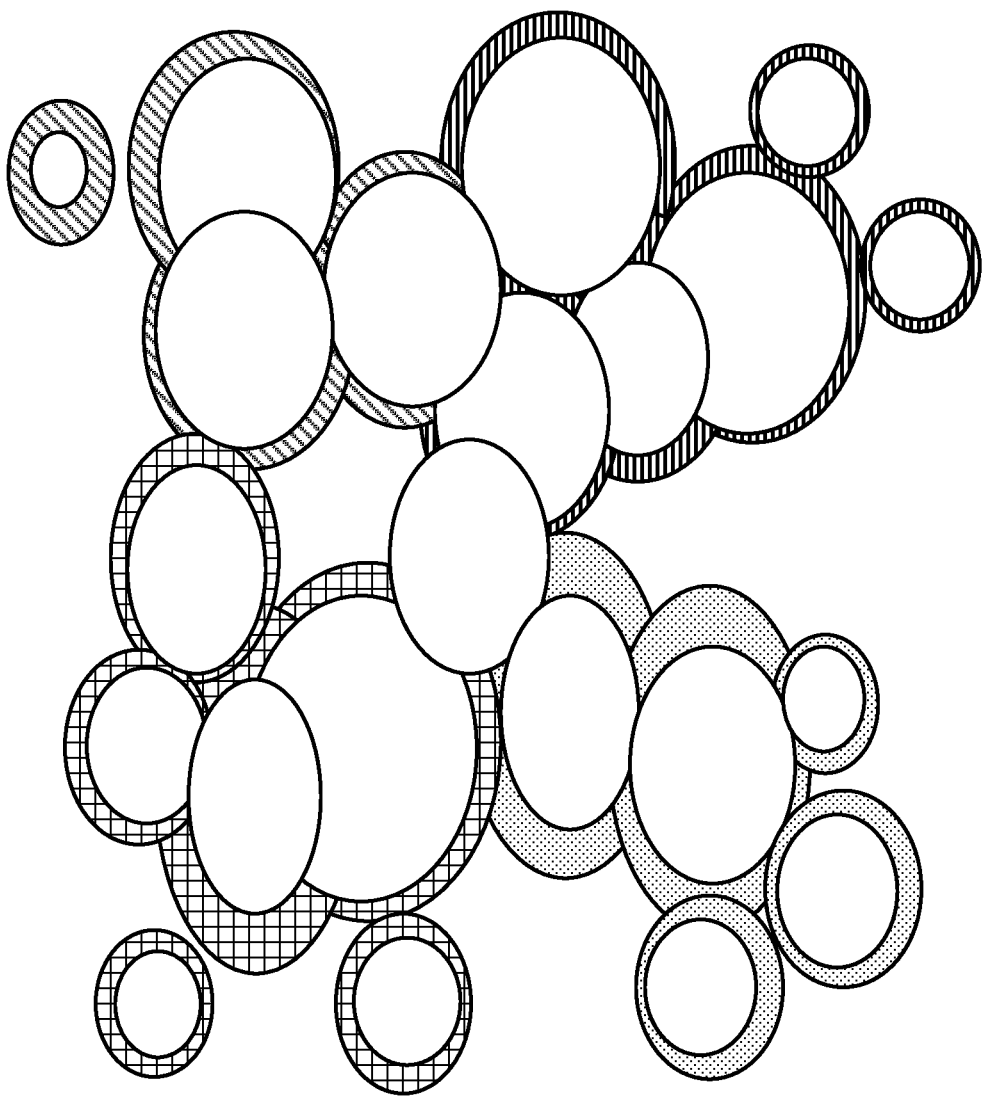
FIG. 26 is a diagram illustrating an example of prediction in which group and individual concepts are calculated from the whole.
Figure 26:
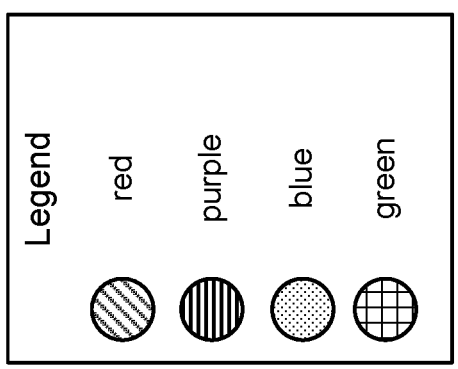

FIG. 26 is a diagram 2602 illustrating an example of prediction in which group and individual concepts are calculated from the whole. The prediction function may be a method of calculating clauses of the figure in a high dimension. By using this method for total input, it may be possible to automatically calculate group and individual concepts from the whole.

Figure 27:
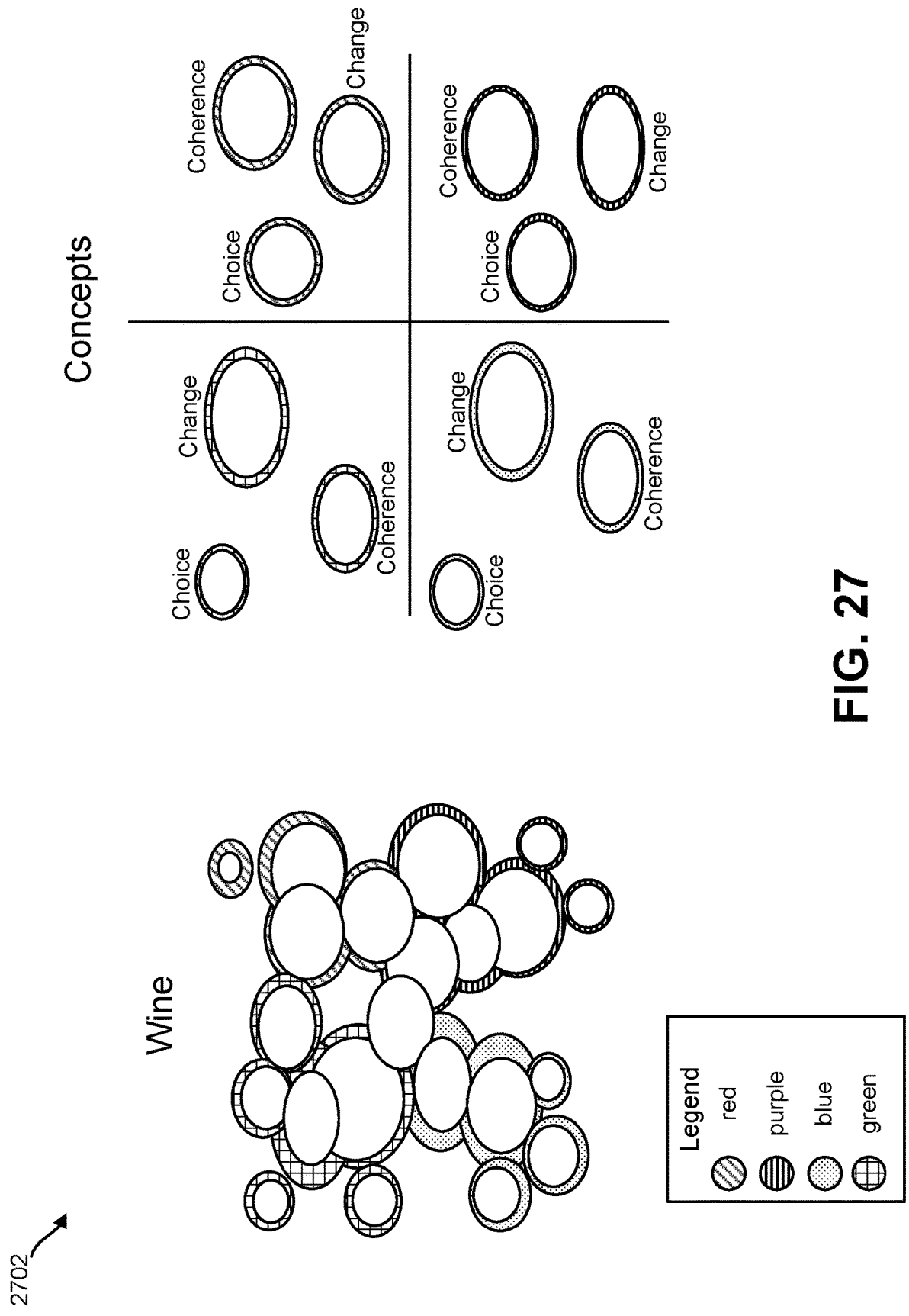
FIG. 27 is a diagram illustrating an example of analysis of shape differences between groups in other themes.

FIG. 27 is a diagram 2702 illustrating an example of analysis of shape differences between groups in other themes. By using inter-theme analysis for each group in one theme automatically divided by statistical processing, it may be possible to analyze the difference in shape between groups in other themes.

Figure 28:
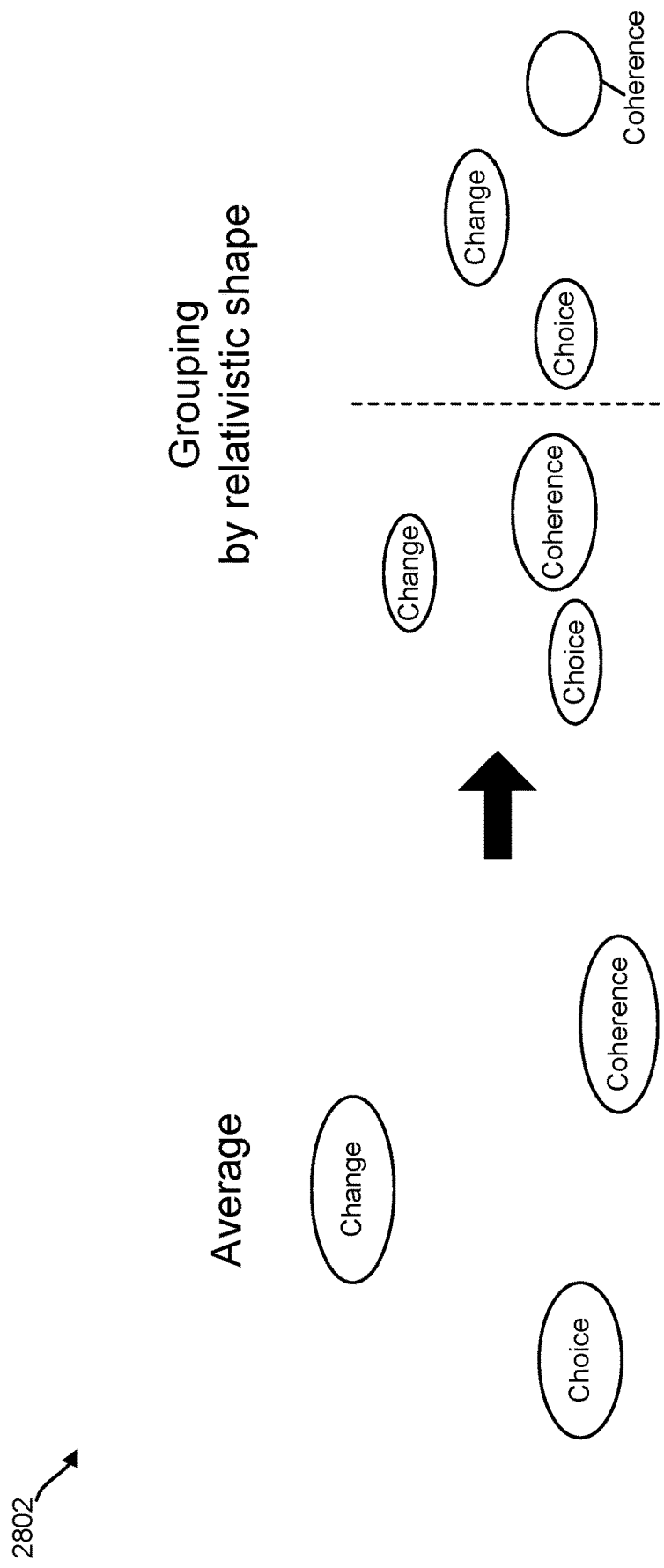
FIG. 28 is a diagram illustrating an example of grouping by relativistic shape.

FIG. 28 is a diagram 2802 illustrating an example of grouping by relativistic shape. Analysis can be made of the shape of difference from a certain reference value (absolute value or original value) in the same way as the normal shape. This may allow relativistic grouping. By executing the automatic calculation of the clause for the shape of the difference from the reference value, grouping by type of the difference may be performed. For example, it may be effective when the statistical processing results in personal differences being buried and difficult to see. It may also be effective when the difference between deep and surface psychologies by shape may need to be understood.

Figure 29:
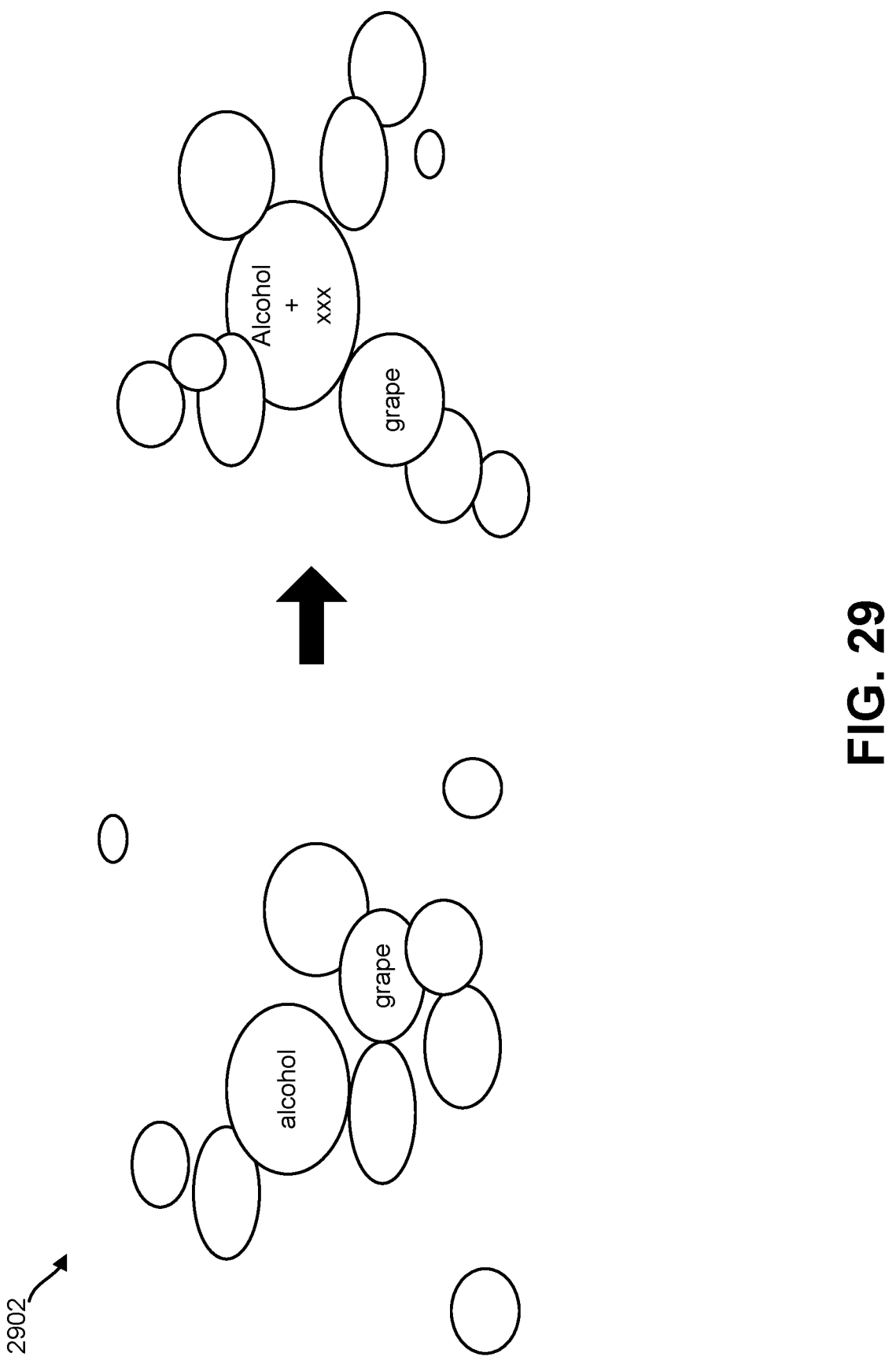
FIG. 29 is a diagram illustrating an example of reforming a figure.

FIG. 29 is a diagram 2902 illustrating an example of reforming a figure. Methods may be automatically proposed that may drastically change the form and viewpoint, such as combining keywords, adding new virtual keywords, reducing keywords, increasing/reducing relations between keywords, etc.

Figure 30:
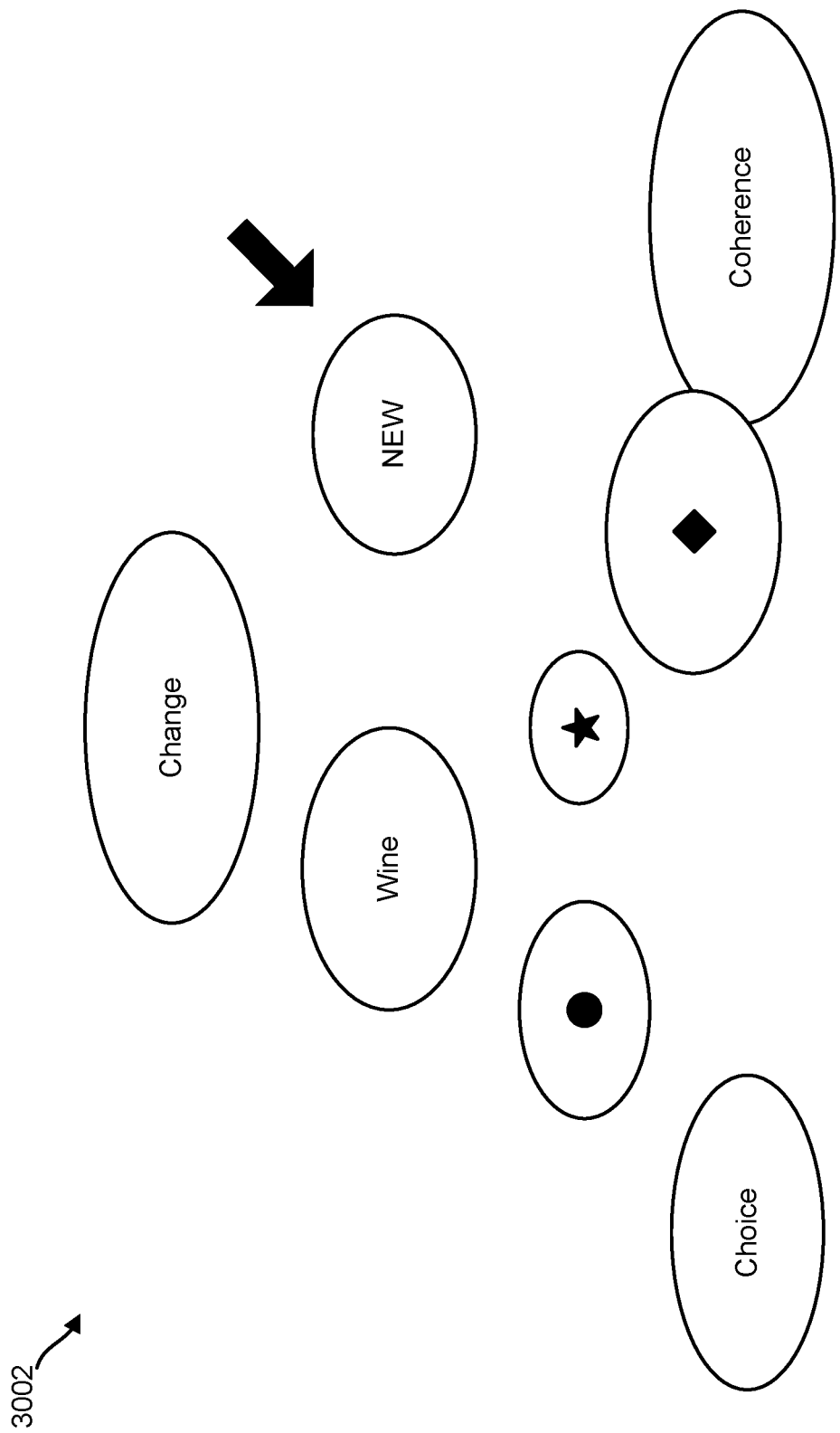
FIG. 30 is a diagram illustrating an example of an integrity analysis.

FIG. 30 is a diagram 3002 illustrating an example of an integrity analysis. Automatic analysis may enable whole products to harmonize with the concept of the company. It may enable proposing direction for new business, or changing/reducing guidelines for existing business.

In one example, integrity analysis may be performed as follows:

$$\begin{matrix} \text{Change} \\ \text{Choice} \\ \text{Coherence} \end{matrix} \overbrace{\begin{pmatrix} 3.138 \\ 0.935 \\ 2.932 \end{pmatrix}}^{\text{NEW}} = \overbrace{\begin{pmatrix} 9.000 \\ 9.000 \\ 9.000 \end{pmatrix}}^{\substack{\text{Arbitrary total} \\ \text{value (input)}}} - \left[ \overbrace{\begin{pmatrix} 3.138 \\ 0.935 \\ 2.932 \end{pmatrix}}^{\text{Wine}} + \ldots + \overbrace{\begin{pmatrix} 3.138 \\ 0.935 \\ 2.932 \end{pmatrix}}^{\star} \right]$$

Summing the degree of relation of one theme group such as products to other theme group such as concepts and subtracting from the total value having the desired balance, the degree of relation of a new theme that improves balance may be calculated.

Figure 31:
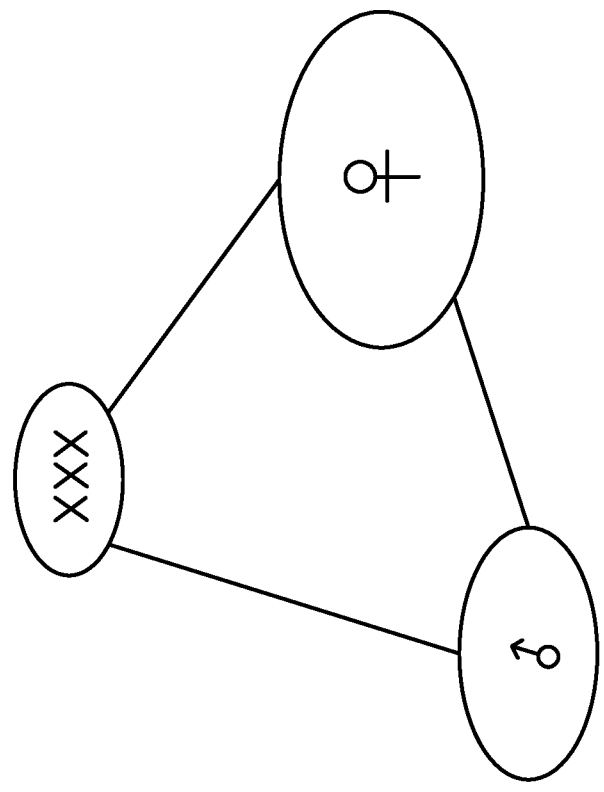
FIG. 31 is a diagram illustrating an example of keywordization of hidden factors.
Figure 31:
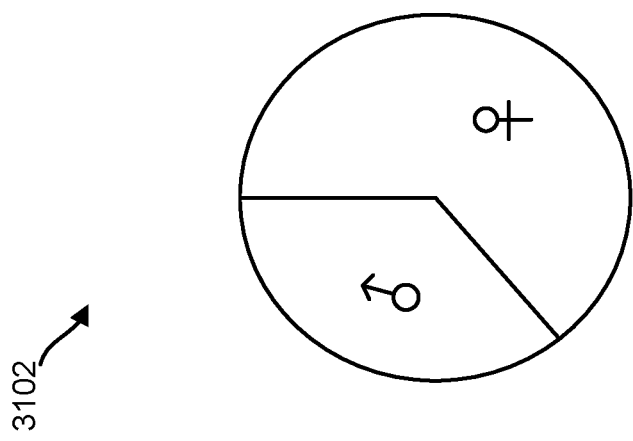
Figure 32:
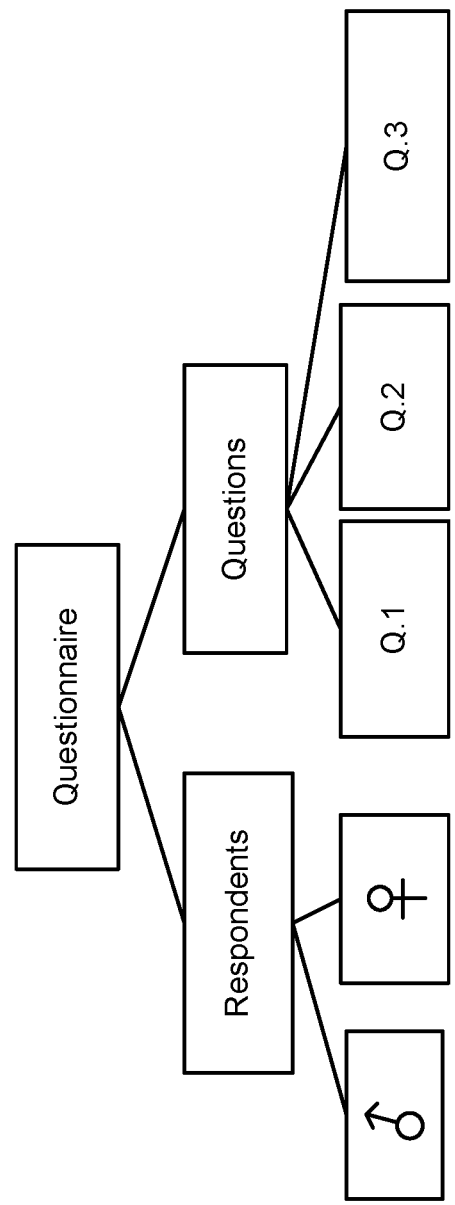
FIG. 32 is a diagram illustrating an example questionnaire.

FIG. 31 is a diagram 3102 illustrating an example of keywordization of hidden factors. This may also be referred to as absolute evaluation. Keywordization of hidden factors may be performed. Merely one relationship, ♂ and ♀ are equivalent. "Keywordization" may mean to regard the condition of absolute evaluation as a keyword. For example, assuming an example questionnaire 3202 such as that shown in FIG. 32, the relation of each keyword to the question as keyword may correspond to the absolute evaluation.

Figure 33:
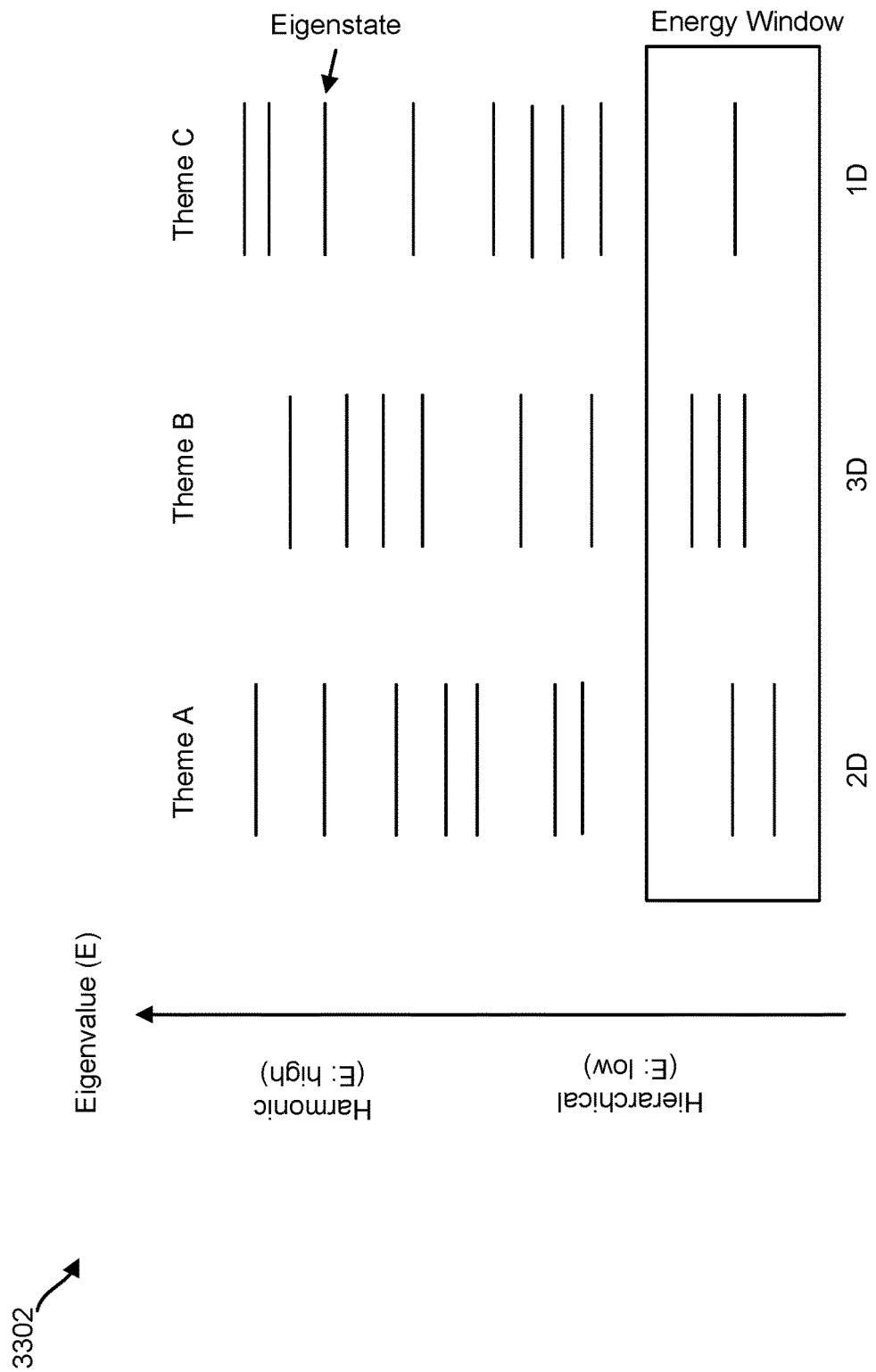
FIG. 33 is a diagram illustrating an example chart showing pseudo dimension of a theme.

FIG. 33 is a diagram 3302 illustrating an example chart showing pseudo dimension of a theme. The shape of the theme may be high-dimension. The effective dimensionality of the theme may be outputted. The effective dimension may be determined by the number of hierarchical eigenstates existing in the energy window of eigenvalues. The width of the window may be set based on the scale of the numerical width of the relation evaluation. Furthermore, by searching for two keywords in each eigenstate that satisfies:

(1) each component of the wave function of the keyword is large, and (2) the degree of relation between the two keyword is small, it may be possible to easily search pairs of keyword that produce large changes in eigenvalues and dimension.

In one configuration, if pseudo dimension of the theme consisting of M keywords is N dimensions, it may be possible to generate localized N keyword-clusters (effective keywords) from the linear combination of the N eigenstates in the window. Practically, it may be simple to localize N effective keywords so that variance is minimized. First, the top N keywords of the total density of N states may be taken as the initial state of effective keyword calculation. The coefficients of the wave function of the effective keyword may be determined so that the sum of variance from each keyword center may be minimized.

Figure 34:
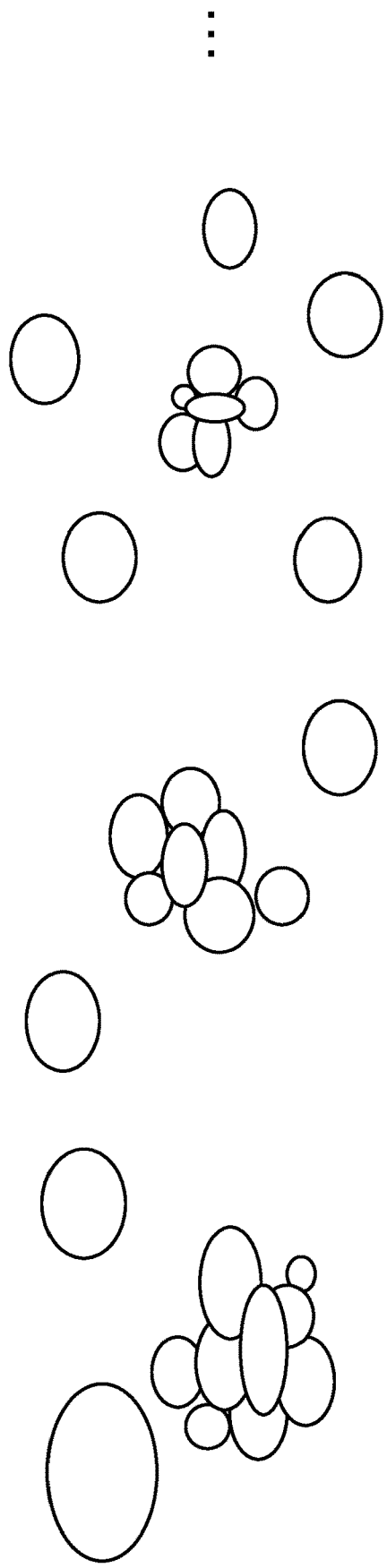
FIG. 34 is a diagram illustrating an example topology.

FIG. 34 is a diagram 3402 illustrating an example topology. Classification of promising useless form as a business not depending on the words analyzed in mathematical physics may be performed. By accumulating both the analysis of the topology of cognition in the project and the result of the project in business, the classification of whether the topology of cognition are promising or useless in business may be possible. The concept of topology may be global, not dependent on the details of the numerical value. It may be possible to obtain good convergence results with respect to the number of samples. Groups and individuals may be categorized by the characteristic keywords forming the outer periphery of the shape in the hierarchical direction. If features of shapes of the different theme are common, it may be said that themes are topologically close beyond details of the keywords. By classifying themes topologically, it may become possible to pattern themes and accumulate their know-how.

Figure 35:
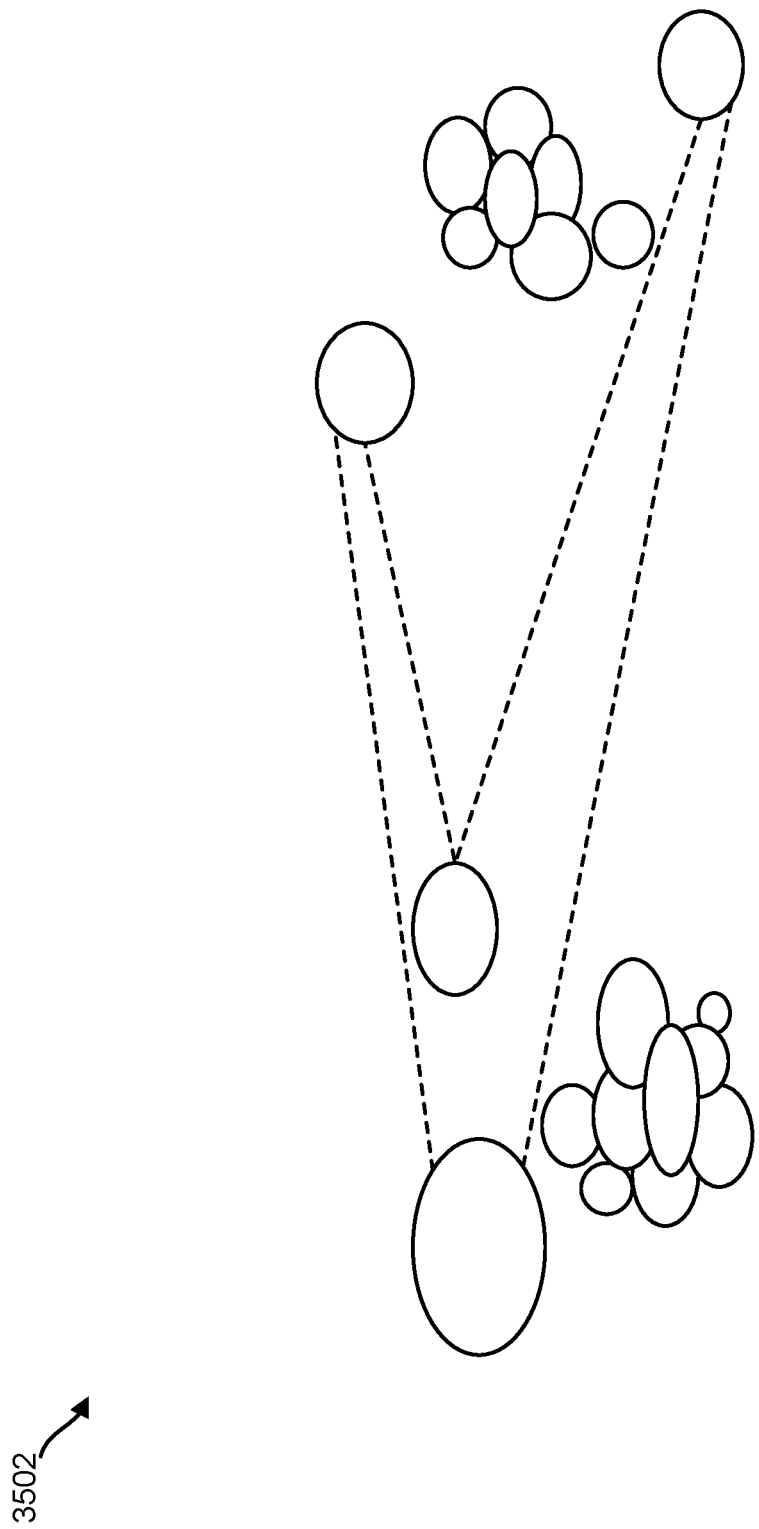
FIG. 35 is a diagram illustrating an example of a topological survey.

FIG. 35 is a diagram 3502 illustrating an example of a topological survey. By analyzing the shape of the theme in real time during the questionnaire, it may be possible to dramatically improve the efficiency and convergence of the survey. First, the values related to the topology are calculated such as weights and dimensions within a theme. Next, for the inter-theme survey, the survey items and scales are reduced drastically by replacing minor keywords outside the threshold to one theme. Furthermore, knowledge of the survey and pattern the topology of deep consciousness may be accumulated. The accumulated pattern of the topology of cognition may help improve the efficiency of the survey. Since the format of input/output does not depend on the details of the keyword, knowledge of patterning may further improve the efficiency of the survey.

In one configuration, data may be automatically analyzed. In the conventional investigation, the analysis side may need to understand the purpose of the investigation, create questions, and analyze the obtained data by considering the meaning. Since the systems and methods described herein analyze in the form, it may not matter the meaning of keywords. Low-cost analysis may be possible.

The systems and methods described herein may provide robust results. For example, even in the case of 0-3, 1-4, or $2^n$, 4-point scale, or 10-point scale, the major result may be almost unchanged. It may be useful for statistics.

The systems and methods described herein use quantum theory. This may provide at least two benefits. First, calculation and definition may be made simple even in higher dimensions. Renormalization etc. may also be benefits of this.

Second, there is no form which cannot be created. For example, in mathematics it may not be possible to construct a triangle of length (1, 1, 4), but it may be possible to create a corresponding figure by treating degree of relation in quantum theory.

The systems and methods described herein may further make it possible to deal with cases where there are keywords that are common among different themes or when themes themselves are mixed in a theme themselves. It may be distinguished as being within a certain theme, or it may be treated as completely the same thing (like a shortcut in PC).

Figure 36:
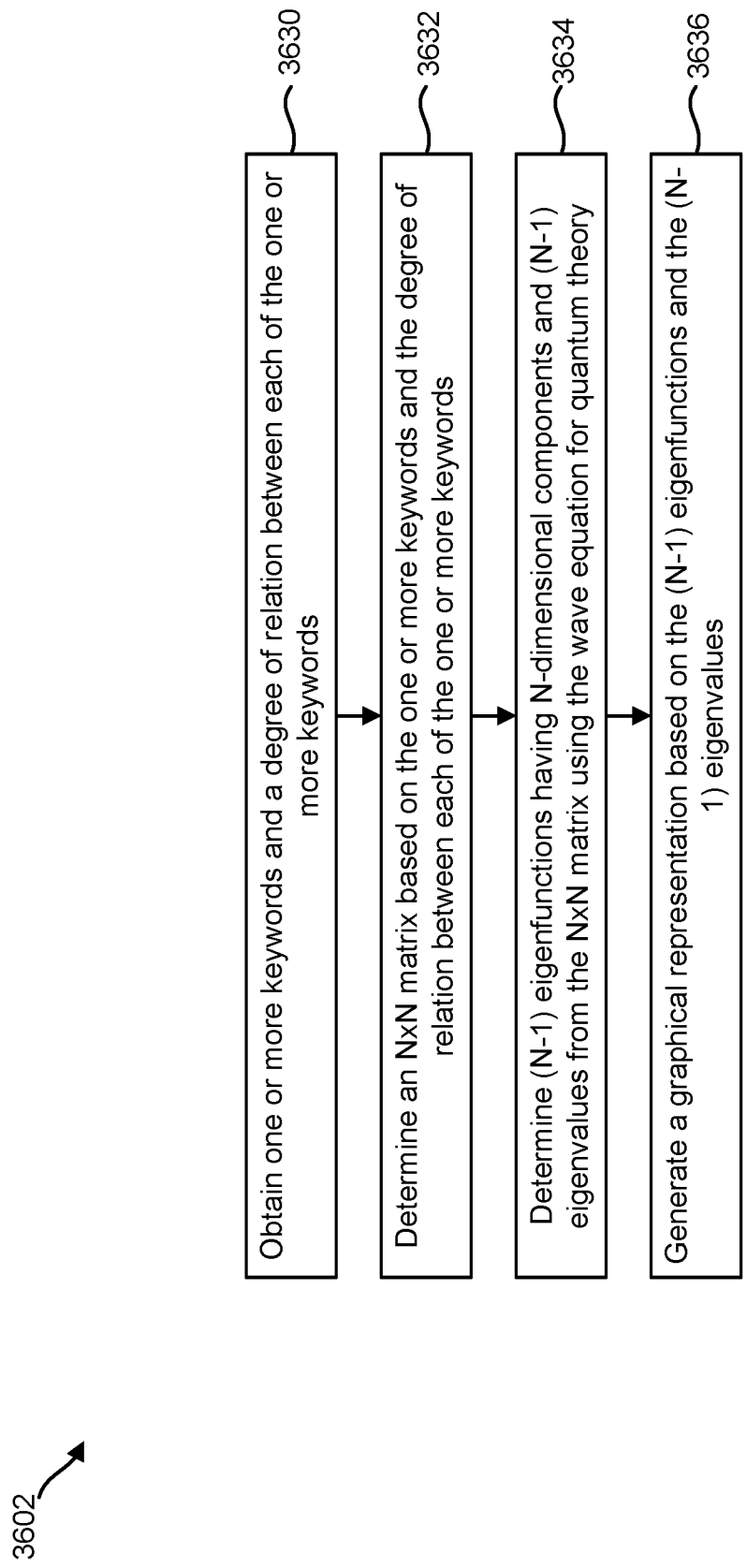
FIG. 36 is flow diagram illustrating one configuration of a method for analyzing human thought.

FIG. 36 is flow diagram illustrating one configuration of a method 3602 for analyzing human thought. One or more keywords and a degree of relation between each of the one or more keywords may be obtained 3630. An N×N matrix may be determined 3632 based on the one or more keywords and the degree of relation between each of the one or more keywords. (N−1) eigenfunctions having N-dimensional components and (N−1) eigenvalues may be determined 3634 from the N×N matrix using the wave equation for quantum theory. A graphical representation may be generated 3636 based on the (N−1) eigenfunctions and the (N−1) eigenvalues.

Figure 37:
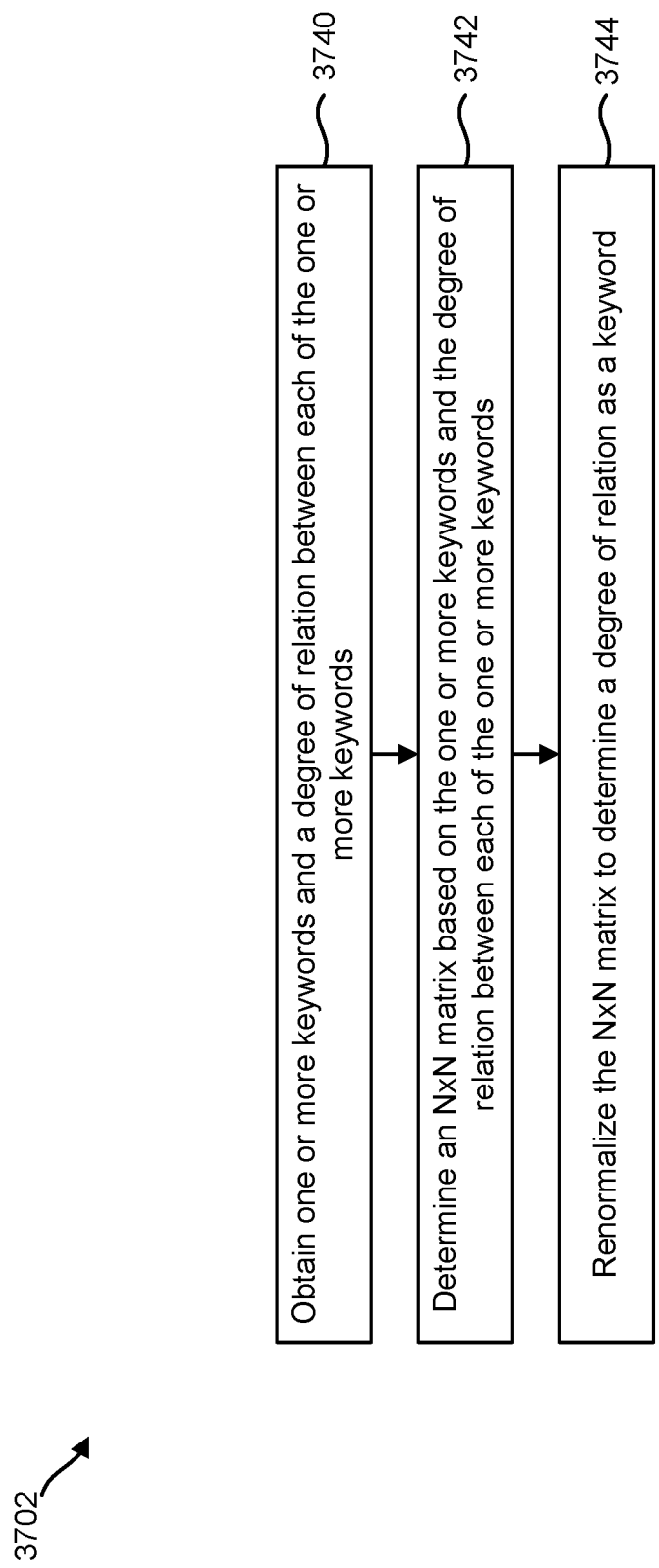
FIG. 37 is flow diagram illustrating another configuration of a method for analyzing human thought

FIG. 37 is flow diagram illustrating another configuration of a method 3702 for analyzing human thought. One or more keywords and a degree of relation between each of the one or more keywords may be obtained 3740. An N×N matrix may be determined 3742 based on the one or more keywords and the degree of relation between each of the one or more keywords. The N×N matrix may be renormalized 3744 to determine a degree of relation as a keyword.

Figure 38:
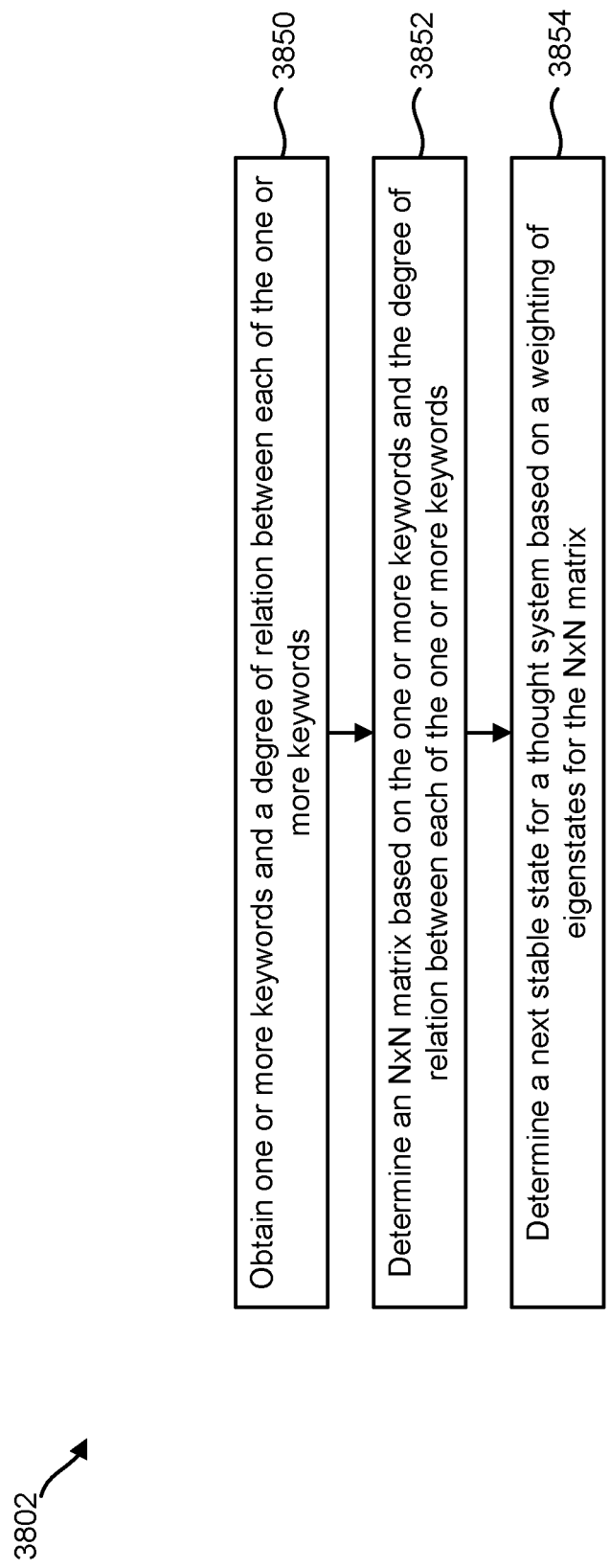
FIG. 38 is flow diagram illustrating another configuration of a method for analyzing human thought.

FIG. 38 is flow diagram illustrating another configuration of a method 3802 for analyzing human thought. One or more keywords and a degree of relation between each of the one or more keywords may be obtained 3850. An N×N matrix may be determined 3852 based on the one or more keywords and the degree of relation between each of the one or more keywords. A next stable state may be determined 3854 for a thought system based on a weighting of eigenstates for the N×N matrix.

Figure 39:
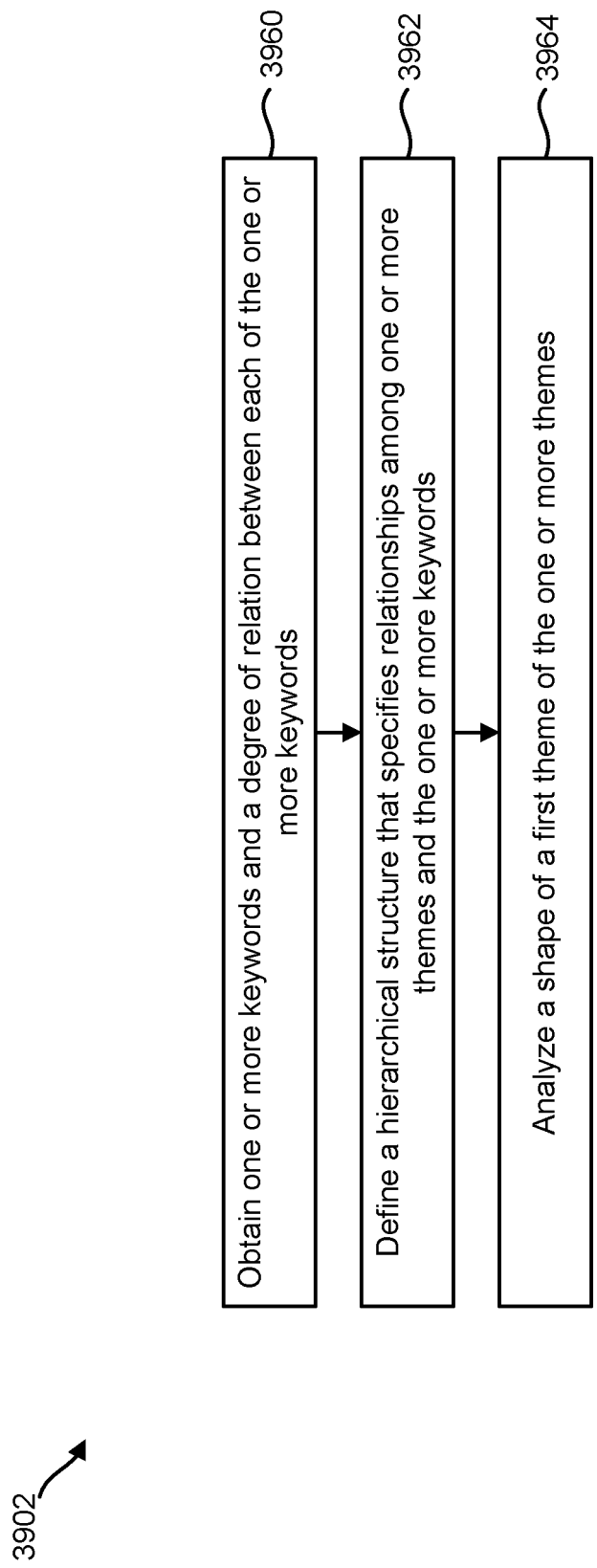
FIG. 39 is a flow diagram illustrating another configuration of a method for analyzing human thought.

FIG. 39 is a flow diagram illustrating another configuration of a method 3902 for analyzing human thought. One or more keywords and a degree of relation between each of the one or more keywords may be obtained 3960. A hierarchical structure may be defined 3962 that specifies relationships among one or more themes and the one or more keywords. A shape may be analyzed 3964 of a first theme of the one or more themes.

Figure 40:
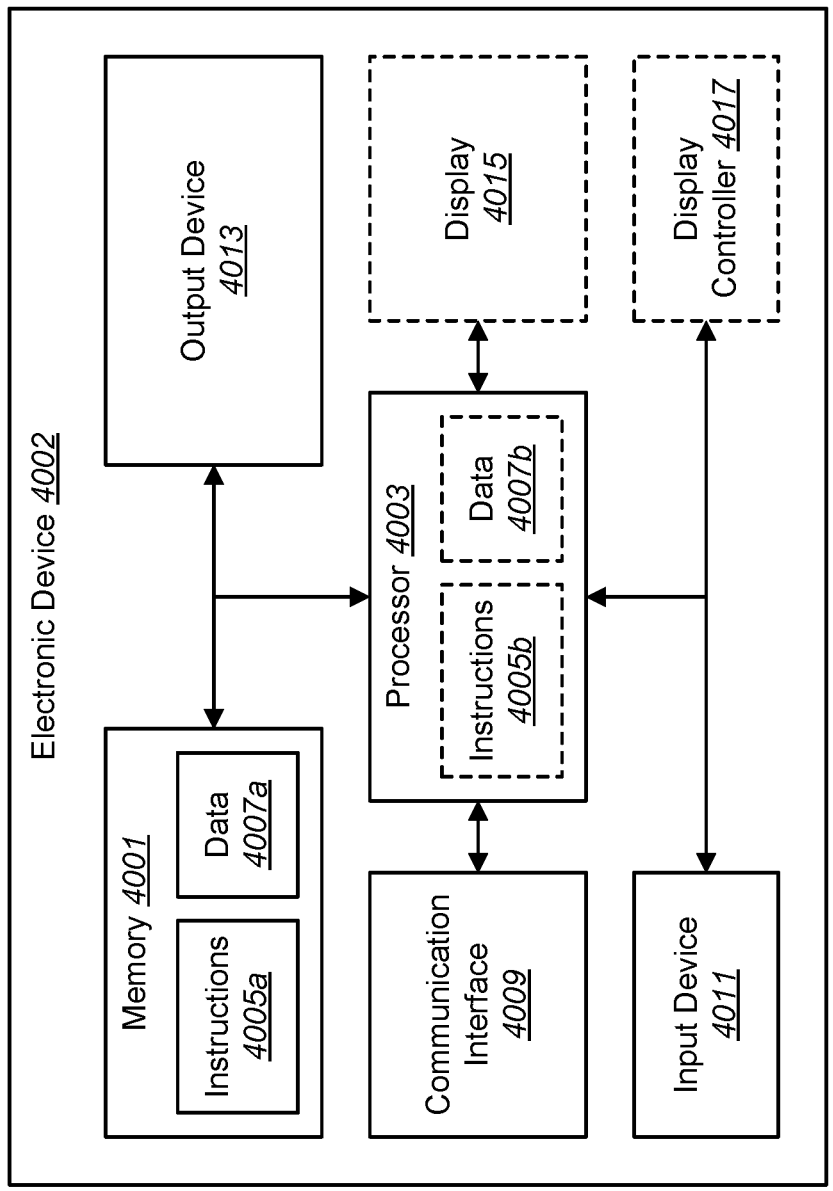
FIG. 40 is a block diagram illustrating one example of an apparatus in which systems and methods for analyzing human thought may be implemented.

FIG. 40 is a block diagram illustrating one example of an electronic device 4002 in which systems and methods for analyzing human thought may be implemented. The electronic device may be configured in accordance with one or more of the devices described herein.

The electronic device 4002 may include a processor 4003 and memory 4001. The memory 4001 may include instructions 4005*b* and data 4007*b*. The processor 4003 controls the operation of the computing device 4002 and may be, for example, a microprocessor, a microcontroller, a digital signal processor (DSP) or another device known in the art. The processor 4003 typically performs logical and arithmetic operations based on program instructions and/or data received from the memory 4001.

The electronic device 4002 typically may include one or more communication interfaces 4009 for communicating with other electronic devices. The communication interfaces 4009 may be based on wired communication technology, wireless communication technology or both. Examples of different types of communication interfaces 4009 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The electronic device 4002 typically may include one or more input devices 4011 and one or more output devices 4013. Examples of different kinds of input devices 4011 include a keyboard, mouse, microphone, remote control device, button, joystick, trackball, touchpad, lightpen, etc. Examples of different kinds of output devices 4013 include a speaker, printer, etc. One specific type of output device 4013 that may be included in a computer system is a display device. Display devices used with configurations disclosed herein may utilize any suitable image projection technology, such as liquid crystal display (LCD), light-emitting diode (LED), gas plasma, electroluminescence, a cathode ray tube (CRT) or the like.

A display controller 4017 may also be provided, for converting data stored in the memory 4001 into text, graphics and/or moving images (as appropriate) shown on the display device 4015. Of course, FIG. 40 illustrates only one possible configuration of an electronic device 4002. Various other architectures and components may be utilized.

The present systems and methods provide a new technique for analyzing figures in high dimension from the degree of relation. Therefore, if the degree of relation can be defined, it can be applied regardless of the genre of technology and technical field. It is possible to obtain input (keywords for the theme and the degree of the relation) from other systems such as vast on-line data. Structuring for cognition is compatible with algorithms of artificial intelligence, because compression of information for high dimensional data is performed by specifying the direction (hierarchical/harmonic) in the configurations described herein. Even if the input is not completely created, it is possible to make a figure within it.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for analyzing a thought system, comprising:
   obtaining one or more keywords and a degree of relation between each of the one or more keywords;

determining an N×N matrix based on the one or more keywords and the degree of relation between each of the one or more keywords;

determining (N−1) eigenfunctions having N-dimensional components and (N−1) eigenvalues from the N×N matrix; and generating a graphical representation based on the (N−1) eigenfunctions and the (N−1) eigenvalues.

2. The method of claim 1, further comprising determining an (N−1)×N matrix by dividing the (N−1) eigenfunctions by the (N−1) eigenvalues.

3. The method of claim 2, wherein the (N−1)×N matrix indicates coordinates of N points in an (N−1) dimension.

4. The method of claim 2, wherein the (N−1) eigenvalues indicate a view of a (N−1) dimensional figure.

5. The method of claim 1, further comprising defining a hierarchical structure that specifies relationships among one or more themes and the one or more keywords.

6. The method of claim 1, wherein generating the graphical representation comprises selecting two axes from (N−1) directions.

7. The method of claim 1, wherein generating the graphical representation comprises generating coordinates for the one or more keywords, wherein generating coordinates in the (N−1) dimension for the i-th keyword comprises multiplying (N−1) eigenfunctions, excluding trivial solutions, by a reciprocal weight of eigenvalues.

8. The method of claim 1, wherein the (N−1) eigenfunctions are determined for the harmonic and/or hierarchical directions.

9. A method for renormalizing keywords in a thought system, comprising:

obtaining one or more keywords and a degree of relation between each of the one or more keywords;

determining an N×N matrix based on the one or more keywords and the degree of relation between each of the one or more keywords; and renormalizing the N×N matrix to determine a degree of relation between one or more themes as a keyword.

10. The method of claim 9, further comprising determining a degree of relation between concepts.

11. The method of claim 9, further comprising defining a hierarchical structure that specifies relationships among the one or more themes and the one or more keywords.

12. A method for surveying the topology in a thought system, comprising:

obtaining one or more keywords and a degree of relation between each of the one or more keywords;

defining a hierarchical structure that specifies relationships among one or more themes and the one or more keywords;

analyzing a shape of a first theme of the one or more themes, comprising calculating values relating to a topology;

replacing one or more minor keywords outside a threshold; and patterning the topology.

13. An electronic device, comprising:

means for obtaining one or more keywords and a degree of relation between each of the one or more keywords;

means for determining an N×N matrix based on the one or more keywords and the degree of relation between each of the one or more keywords;

means for determining (N−1) eigenfunctions having N-dimensional components and (N−1) eigenvalues from the N×N matrix; and means for generating a graphical representation based on the (N−1) eigenfunctions and the (N−1) eigenvalues.

14. An electronic device, comprising:

means for obtaining one or more keywords and a degree of relation between each of the one or more keywords;

means for determining an N×N matrix based on the one or more keywords and the degree of relation between each of the one or more keywords; and means for renormalizing the N×N matrix to determine a degree of relation between one or more themes as a keyword.

15. An electronic device, comprising:

means for obtaining one or more keywords and a degree of relation between each of the one or more keywords;

means for defining a hierarchical structure that specifies relationships among one or more themes and the one or more keywords;

means for analyzing a shape of a first theme of the one or more themes, comprising means for calculating values relating to a topology;

means for replacing one or more minor keywords outside a threshold; and means for patterning the topology.

16. An electronic device, comprising:

at least one processor configured to:

obtain one or more keywords and a degree of relation between each of the one or more keywords;

determine an N×N matrix based on the one or more keywords and the degree of relation between each of the one or more keywords;

determine (N−1) eigenfunctions having N-dimensional components and (N−1) eigenvalues from the N×N matrix; and generate a graphical representation based on the (N−1) eigenfunctions and the (N−1) eigenvalues;

memory in electronic communication with the at least one processor.

17. An electronic device, comprising:

at least one processor configured to:

obtain one or more keywords and a degree of relation between each of the one or more keywords;

determine an N×N matrix based on the one or more keywords and the degree of relation between each of the one or more keywords; and renormalize the N×N matrix to determine a degree of relation between one or more themes as a keyword;

memory in electronic communication with the at least one processor.

18. An electronic device, comprising:

at least one processor configured to:

obtain one or more keywords and a degree of relation between each of the one or more keywords;

define a hierarchical structure that specifies relationships among one or more themes and the one or more keywords;

analyze a shape of a first theme of the one or more themes, comprising the processor to:

calculate values relating to a topology;

replace one or more minor keywords outside a threshold; and pattern the topology; and memory in electronic communication with the at least one processor.

19. A non-transitory computer-readable medium comprising code for causing an electronic device to:

obtain one or more keywords and a degree of relation between each of the one or more keywords;

determine an N×N matrix based on the one or more keywords and the degree of relation between each of the one or more keywords;

determine (N−1) eigenfunctions having N-dimensional components and (N−1) eigenvalues from the N×N matrix; and generate a graphical representation based on the (N−1) eigenfunctions and the (N−1) eigenvalues.

20. A non-transitory computer-readable medium comprising code for causing an electronic device to:

obtain one or more keywords and a degree of relation between each of the one or more keywords;

determine an N×N matrix based on the one or more keywords and the degree of relation between each of the one or more keywords; and renormalize the N×N matrix to determine a degree of relation between one or more themes as a keyword.

21. A non-transitory computer-readable medium comprising code for causing an electronic device to:

obtain one or more keywords and a degree of relation between each of the one or more keywords;

define a hierarchical structure that specifies relationships among one or more themes and the one or more keywords;

analyze a shape of a first theme of the one or more themes, comprising calculating values relating to a topology;

replacing one or more minor keywords outside a threshold; and patterning the topology.

\* \* \* \* \*